(12) United States Patent
Hirano

(10) Patent No.: US 9,744,926 B2
(45) Date of Patent: Aug. 29, 2017

(54) VEHICULAR POWER SUPPLY APPARATUS

(71) Applicant: Takahiro Hirano, Toyota (JP)

(72) Inventor: Takahiro Hirano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 14/647,665

(22) PCT Filed: Dec. 27, 2013

(86) PCT No.: PCT/IB2013/002878
§ 371 (c)(1),
(2) Date: May 27, 2015

(87) PCT Pub. No.: WO2014/114977
PCT Pub. Date: Jul. 31, 2014

(65) Prior Publication Data
US 2015/0307041 A1    Oct. 29, 2015

(30) Foreign Application Priority Data
Jan. 24, 2013    (JP) .................................. 2013-010930

(51) Int. Cl.
*B60L 1/00*    (2006.01)
*B60R 16/03*    (2006.01)
(Continued)

(52) U.S. Cl.
CPC ............ *B60R 16/03* (2013.01); *H02J 7/0013* (2013.01); *H02J 7/0021* (2013.01); *H02J 7/0068* (2013.01);
(Continued)

(58) Field of Classification Search
CPC ....... B60R 16/03; H02J 7/0021; H02J 7/0073; H02J 2007/0067; H02J 7/0013; H02J 7/0068; H02J 7/1423; H02J 7/0077
(Continued)

(56) References Cited

U.S. PATENT DOCUMENTS 7,477,502 B1    1/2009 Faulkner et al.
2002/0140397 A1    10/2002 Hasegawa et al.
(Continued)

FOREIGN PATENT DOCUMENTS

CN    101828317 A    9/2010
DE    20013407    * 8/2000    ............... H02J 7/34
(Continued)

OTHER PUBLICATIONS

"Transistor circuit test and fault finding using a multimeter," Electronic Radio today, Jun. 17, 2012, pp. 1-8, retrieved from http://web.archive.org/web/20120617231622/http://www.electronics-radio.com/articles/test-methods/meters/transistor-circuit-fault-finding.php on May 12, 2014.
(Continued)

*Primary Examiner* — Jared Fureman
*Assistant Examiner* — Duc M Pham
(74) *Attorney, Agent, or Firm* — Oliff PLC

(57) ABSTRACT

A vehicular power supply apparatus includes: a first port to which an electric load is connected; a second port to which a first storage apparatus is connected; a third port to which a second storage apparatus is connected; a fourth port to which a power generation apparatus is connected; a first switch disposed between the first and second ports; a second switch disposed between the second and fourth ports; a third switch disposed between the first and third ports; a fourth switch disposed between the third and fourth ports; and a condition switching unit configured to switch between a first
(Continued)

condition in which the first and fourth switches are conductive, the second and third switches are cut off, and a second condition in which the first sand fourth switches are cut off, the second and the switches are conductive.

20 Claims, 11 Drawing Sheets

(51) Int. Cl.
  *H02J 7/00* (2006.01)
  *H02J 7/14* (2006.01)
(52) U.S. Cl.
  CPC .......... *H02J 7/0073* (2013.01); *H02J 7/0077* (2013.01); *H02J 7/1423* (2013.01); *H02J 2007/0067* (2013.01)
(58) Field of Classification Search
  USPC ....................................................... 307/10.1
  See application file for complete search history.

(56) References Cited

U.S. PATENT DOCUMENTS

| | | |
|---|---|---|
| 2009/0206660 A1 | 8/2009 | Makita et al. |
| 2010/0237828 A1* | 9/2010 | Maegawa ......... H01M 10/0413 320/118 |
| 2012/0035836 A1* | 2/2012 | Mueller .............. F02N 11/0866 701/113 |
| 2013/0119936 A1* | 5/2013 | Emori ................... B60L 3/0046 320/118 |
| 2014/0167654 A1* | 6/2014 | Brockerhoff .............. H02P 7/00 318/139 |

FOREIGN PATENT DOCUMENTS

| | | |
|---|---|---|
| DE | 200 13 407 U1 | 2/2001 |
| JP | S63-117239 U | 7/1988 |
| JP | H05-219659 A | 8/1993 |
| JP | H05-72599 U | 10/1993 |
| JP | H06-319204 A | 11/1994 |
| JP | H10-308529 A | 11/1998 |
| JP | 2002-305843 A | 10/2002 |
| JP | 2005-287146 A | 10/2005 |
| JP | 2007-307931 A | 11/2007 |

OTHER PUBLICATIONS

Feb. 17, 2015 Office Action issued in Japanese Patent Application No. 2013-010930.

* cited by examiner

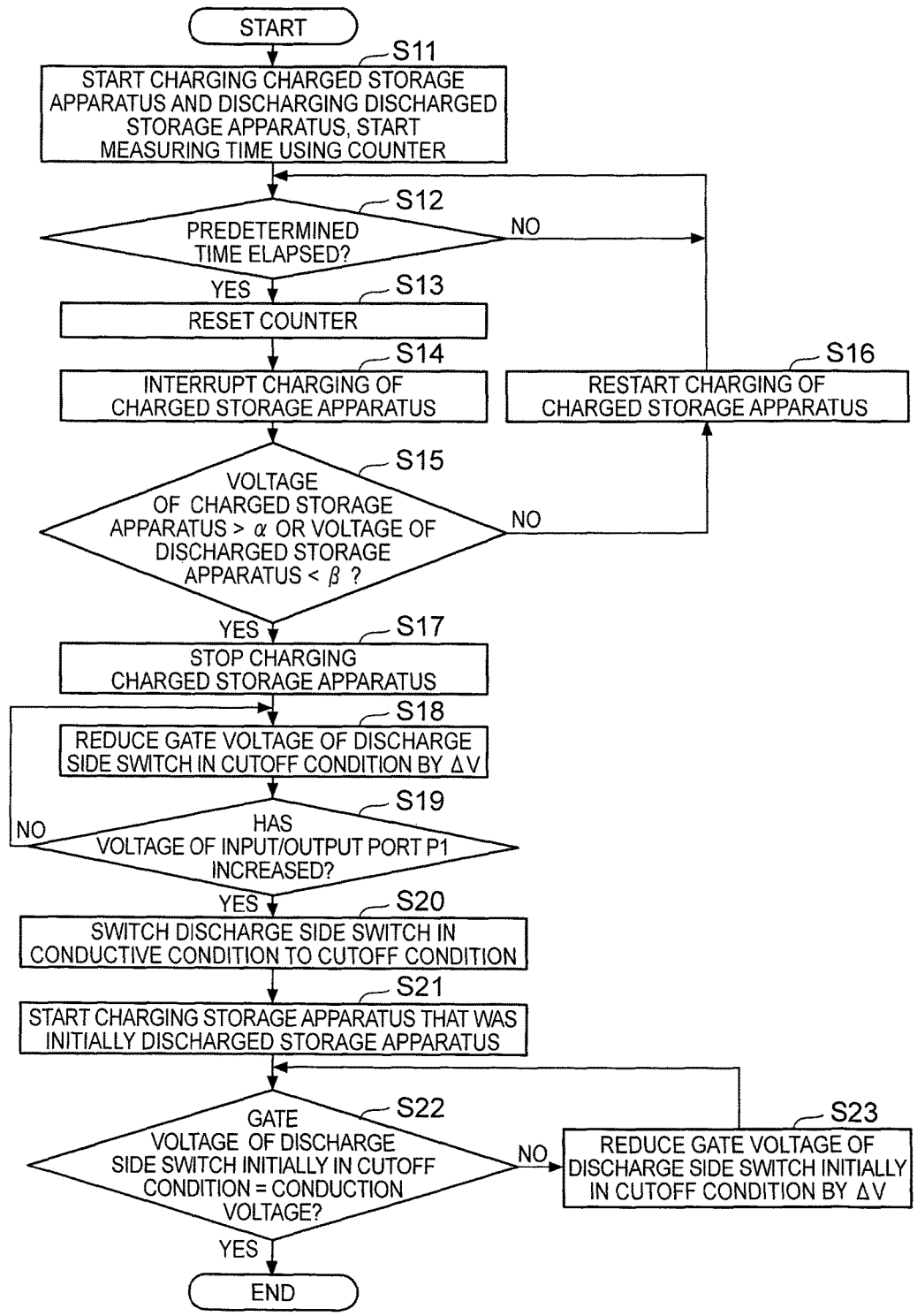

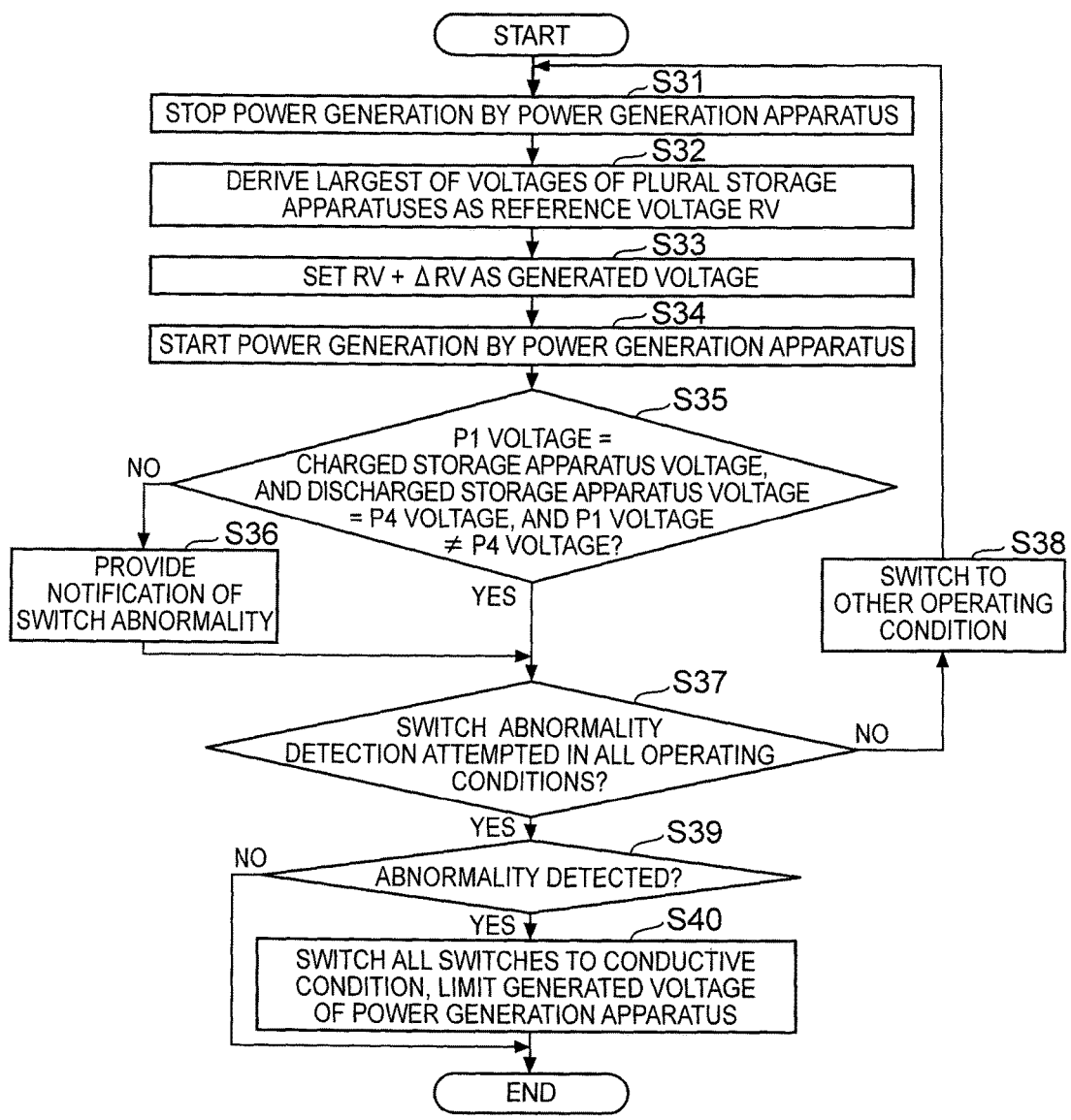

US 9,744,926 B2

VEHICULAR POWER SUPPLY APPARATUS

BACKGROUND OF THE INVENTION

1. Field of the Invention

The invention relates to a vehicular power supply apparatus that is connected to an electric load, a power generation apparatus, and a storage apparatus.

2. Description of Related Art

A conventional vehicular double power supply system includes a high voltage power supply and a low voltage power supply (see Japanese Patent Application Publication No. 2007-307931 (JP 2007-307931 A), for example).

In this vehicular double power supply system, a power generator serving as the low voltage power supply, which generates power using a rotation output of an engine, and a battery serving as the high voltage power supply, which supplies a higher voltage than the low voltage system power supply, are connected via a direct current-to-direct current (DC-DC) converter.

Since the vehicular double power supply system described in JP 2007-307931 A uses a DC-DC converter, however, a manufacturing cost thereof is high.

SUMMARY OF THE INVENTION

The invention provides a vehicular power supply apparatus having a reduced manufacturing cost.

A vehicular power supply apparatus according to one aspect of the invention includes: a first port to which an electric load is connected; a second port to which a first storage apparatus is connected; a third port to which a second storage apparatus is connected; a fourth port to which a power generation apparatus is connected; a first switch disposed between the first port and the second port; a second switch disposed between the second port and the fourth port; a third switch disposed between the first port and the third port; a fourth switch disposed between the third port and the fourth port; and a condition switching unit configured to switch between a first condition in which the first switch is conductive, the second switch is cut off, the third switch is cut off, and the fourth switch is conductive, and a second condition in which the first switch is cut off, the second switch is conductive, the third switch is conductive, and the fourth switch is cut off.

According to the configuration described above, a vehicular power supply apparatus having a reduced manufacturing cost can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a flowchart showing a flow of second condition switching processing;

FIG. 12 is a flowchart showing a flow of switch abnormality detection processing.

DETAILED DESCRIPTION OF EMBODIMENTS

Embodiments of the invention will be described below with reference to the drawings.

Figure 1:
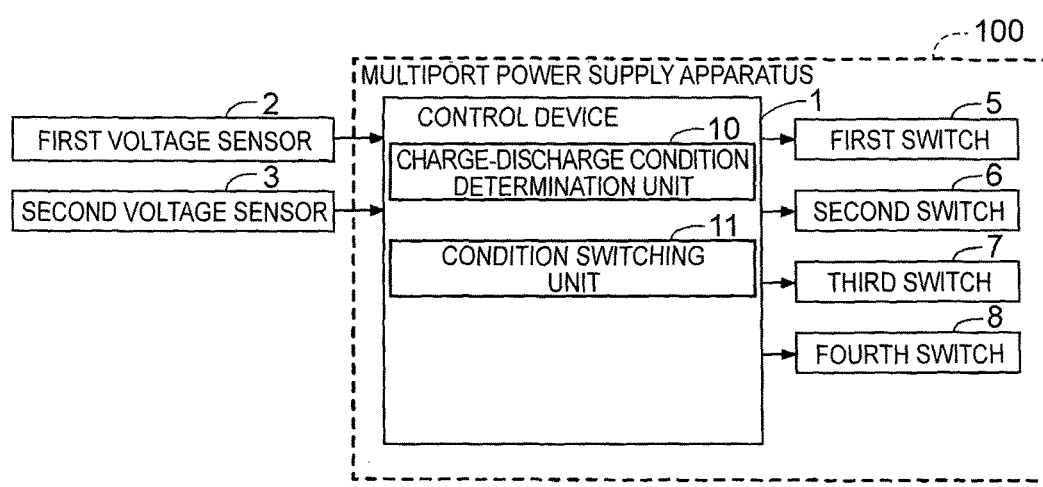
FIG. 1 is a functional block diagram showing an example of a configuration of a multiport power supply apparatus according to a first embodiment of the invention.
Figure 2:
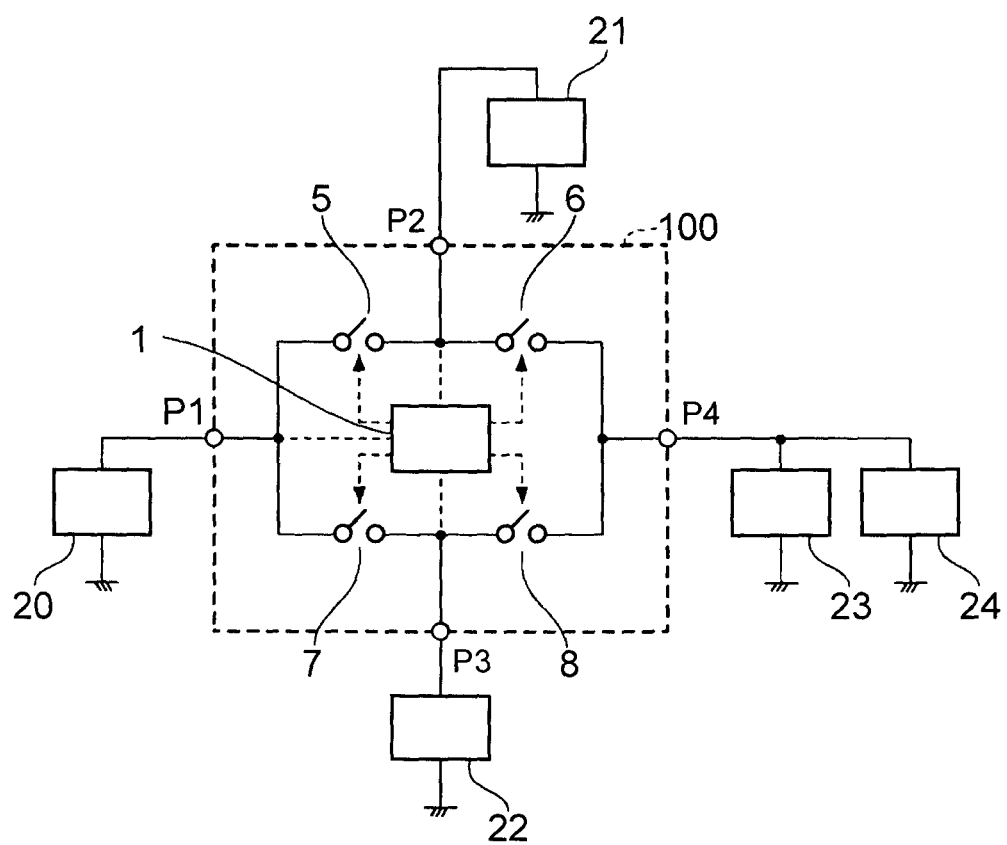
FIG. 2 is a schematic circuit diagram of a power supply system including the multiport power supply apparatus shown in FIG. 1.

FIG. 1 is a functional block diagram showing an example of a configuration of a multiport power supply apparatus 100 serving as a vehicular power supply apparatus according to a first embodiment of the invention. Further, FIG. 2 is a schematic circuit diagram showing an example of a configuration of a power supply system including the multiport power supply apparatus 100 shown in FIG. 1.

The multiport power supply apparatus 100 is an in-vehicle apparatus installed in a vehicle that uses an engine, an electric motor, and so on as a drive source. In this embodiment, the multiport power supply apparatus 100 includes, as main constituent elements, a control device 1, a first switch 5, a second switch 6, a third switch 7, and a fourth switch 8. The multiport power supply apparatus 100 also includes four input/output ports P1, P2, P3, and P4. In this embodiment, an electric load 20 is connected to the input/output port P1, a first storage apparatus 21 is connected to the input/output port P2, a second storage apparatus 22 is connected to the input/output port P3, and a power generation apparatus 23 and a startup apparatus 24 are connected to the input/output port P4.

The electric load 20 is an electric load configured to be operated using power supplied by the first storage apparatus 21 or the second storage apparatus 22. In this embodiment, the electric load 20 is an electric load configured to be operated using power from a 12 V system, and includes various electronic control units (ECUs).

The first storage apparatus 21 and the second storage apparatus 22 are in-vehicle apparatuses configured to be charged and discharged. In this embodiment, the first storage apparatus 21 and the second storage apparatus 22 function as auxiliary batteries of the 12 V system configured to be charged with power generated by the power generation apparatus 23 and supply power to the electric load 20 and the startup apparatus 24. Further, respective capacities of the first storage apparatus 21 and the second storage apparatus 22 may be set at half the capacity of a normal auxiliary battery. The reason for this is that an approximately identical capacity to that of a normal auxiliary battery can be provided by a sum of the respective capacities of the first storage apparatus 21 and the second storage apparatus 22.

The power generation apparatus 23 is driven by the drive source, such as the engine or the electric motor. In this embodiment, the power generation apparatus 23 is an alternator driven by the engine, and outputs the power of the 12 V system.

The startup apparatus 24 starts the drive source of the vehicle. In this embodiment, the startup apparatus 24 is a starter motor that starts the engine.

The control device 1 controls an operation of the multiport power supply apparatus 100. In this embodiment, the control device 1 is a computer including a central processing unit (CPU), a random access memory (RAM), a read only memory (ROM), an input/output interface, and so on. The control device 1 reads programs corresponding to various functional elements such as a charge-discharge condition determination unit 10 and a condition switching unit 11 from the ROM or the RAM, and causes the CPU to execute processing corresponding to the various functional elements. More specifically, the control device 1 (condition switching unit 11) executes calculations corresponding to the various functional elements after receiving outputs from a first voltage sensor 2, a second voltage sensor 3, and so on, and controls the first switch 5, the second switch 6, the third switch 7, the fourth switch 8, and the like on the basis of results of the calculations.

The first switch 5, second switch 6, third switch 7, and fourth switch 8 are devices for switching an electric circuit between a conductive condition and a cutoff condition. In this embodiment, the first switch 5, second switch 6, third switch 7, and fourth switch 8 are constituted by contact relays or contactless relays configured to be switched between a conductive condition and a cutoff condition.

The first switch 5 is disposed on a power line connecting the input/output port P1 to the input/output port P2. The second switch 6 is disposed on a power line connecting the input/output port P2 to the input/output port P4. The third switch 7 is disposed on a power line connecting the input/output port P1 to the input/output port P3. The fourth switch 8 is disposed on a power line connecting the input/output port P3 to the input/output port P4.

The first voltage sensor 2 and the second voltage sensor 3 detect voltages required to operate the multi-power power supply unit 100. In this embodiment, the first voltage sensor 2 is attached in order to detect a voltage of the input/output port P2, or in other words a voltage of the first storage apparatus 21. The first voltage sensor 2 detects the voltage of the input/output port P2 repeatedly at predetermined period intervals, and outputs a detected voltage value to the control device 1. The second voltage sensor 3 is attached in order to detect a voltage of the input/output port P3, or in other words a voltage of the second storage apparatus 22. The second voltage sensor 3 detects the voltage of the input/output port P3 repeatedly at predetermined period intervals, and outputs a detected voltage value to the control device 1.

The charge-discharge condition determination unit 10 determines a charge-discharge condition of the first storage apparatus 21 and the second storage apparatus 22. In this embodiment, the charge-discharge condition determination unit 10 obtains the voltage value of the input/output port P2 output by the first voltage sensor 2 and the voltage value of the input/output port P3 output by the second voltage sensor 3. The charge-discharge condition determination unit 10 then determines, on the basis of the obtained voltage values, whether or not the charge-discharge condition of the first storage apparatus 21 and the second storage apparatus 22 corresponds to a predetermined condition. More specifically, when the respective obtained voltage values are within a range extending from a second predetermined value $\beta$ (12 V, for example) to a first predetermined value $\alpha$ (13 V, for example), the charge-discharge condition determination unit 10 determines that the storage apparatuses are in a charge-discharge switch unnecessary condition. The charge-discharge switch unnecessary condition is a condition in which there is no need to discharge the storage apparatus currently being charged or no need to charge the storage apparatus currently being discharged. Alternatively, when the voltage of the storage apparatus currently being charged, from among the first storage apparatus 21 and the second storage apparatus 22, is equal to or smaller than the first predetermined value $\alpha$, the charge-discharge condition determination unit 10 may determine that the storage apparatus currently being charged is in the charge-discharge switch unnecessary condition without comparing the voltage to the second predetermined value $\beta$. Further, when the voltage of the storage apparatus currently being discharged, from among the first storage apparatus 21 and the second storage apparatus 22, is equal to or larger than the second predetermined value $\beta$, the charge-discharge condition determination unit 10 may determine that the storage apparatus currently being discharged is in the charge-discharge switch unnecessary condition without comparing the voltage to the first predetermined value $\alpha$. In this case, the charge-discharge condition determination unit 10 determines which of the first storage apparatus 21 and the second storage apparatus 22 is being charged and which is being discharged on the basis of the conductive/cutoff conditions of the first to fourth switches 5 to 8, for example. Note that when the voltage of the storage apparatus being charged exceeds the first predetermined value $\alpha$, the charge-discharge condition determination unit 10 determines that the storage apparatus being charged is in a condition of requiring discharging (to be referred to as a "discharge necessary condition" hereafter). Further, when the voltage of the storage apparatus being discharged is smaller than the second predetermined value $\beta$, the charge-discharge condition determination unit 10 determines that the storage apparatus being discharged is in a condition of requiring charging (to be referred to as a "charging necessary condition" hereafter).

The condition switching unit 11 switches an operating condition of the multiport power supply apparatus 100. In this embodiment, the condition switching unit 11 switches the operating condition of the multiport power supply apparatus 100 on the basis of a determination result from the charge-discharge condition determination unit 10.

Specifically, the condition switching unit 11 switches the operating condition of the multiport power supply apparatus 100 when the charge-discharge condition determination unit 10 determines that at least one of the first storage apparatus 21 and the second storage apparatus 22 is not in the charge-discharge switch unnecessary condition. More specifically, the condition switching unit 11 switches the switches in the conductive condition, from among the first to fourth switches 5 to 8, to the cutoff condition and switches the switches in the cutoff condition to the conductive condition.

For example, a case in which the first switch 5 and fourth switch 8 are in the conductive condition and the second switch 6 and third switch 7 are in the cutoff condition may be envisaged. In this case, the first storage apparatus 21 is currently being discharged, or in other words the first storage apparatus 21 is supplying power to the electric load 20, while the second storage apparatus 22 is currently being charged, or in other words the power generation apparatus 23 is supplying power to the second storage apparatus 22.

In this case, the condition switching unit 11 determines that the second storage apparatus 22 currently being charged is in the discharge necessary condition when the voltage of the second storage apparatus 22 exceeds the first predetermined value $\alpha$. Accordingly, the condition switching unit 11 switches the first and fourth switches 5, 8 to the cutoff condition and switches the second and third switches 6, 7 to the conductive condition. As a result, charging of the second storage apparatus 22 is stopped and discharging of the second storage apparatus 22 is started. Further, discharging of the first storage apparatus 21 is stopped and charging of the first storage apparatus 21 is started. Furthermore, the condition switching unit 11 determines that the first storage apparatus 21 currently being discharged is in the charging necessary condition when the voltage of the first storage apparatus 21 is smaller than the second predetermined value $\beta$. Accordingly, the condition switching unit 11 switches the first and fourth switches 5, 8 to the cutoff condition and switches the second and third switches 6, 7 to the conductive condition. As a result, discharging of the first storage apparatus 21 is stopped and charging of the first storage apparatus 21 is started. Further, charging of the second storage apparatus 22 is stopped and discharging of the second storage apparatus 22 is started. Note that in all cases, a switch between power supply to the electric load 20 from the first storage apparatus 21 and power supply to the electric load 20 from the second storage apparatus 22 is performed instantaneously, and therefore the electric load 20 can receive a continuous power supply.

Similarly, a case in which the first switch 5 and fourth switch 8 are in the cutoff condition and the second switch 6 and third switch 7 are in the conductive condition may be envisaged. In this case, the second storage apparatus 22 is currently being discharged, or in other words the second storage apparatus 22 is supplying power to the electric load 20, while the first storage apparatus 21 is currently being charged, or in other words the power generation apparatus 23 is supplying power to the first storage apparatus 21.

In this case, the condition switching unit 11 determines that the first storage apparatus 21 currently being charged is in the discharge necessary condition when the voltage of the first storage apparatus 21 exceeds the first predetermined value $\alpha$. Accordingly, the condition switching unit 11 switches the first and fourth switches 5, 8 to the conductive condition and switches the second and third switches 6, 7 to the cutoff condition. As a result, charging of the first storage apparatus 21 is stopped and discharging of the first storage apparatus 21 is started. Further, discharging of the second storage apparatus 22 is stopped and charging of the second storage apparatus 22 is started. Furthermore, the condition switching unit 11 determines that the second storage apparatus 22 currently being discharged is in the charging necessary condition when the voltage of the second storage apparatus 22 is smaller than the second predetermined value $\beta$. Accordingly, the condition switching unit 11 switches the first and fourth switches 5, 8 to the conductive condition and switches the second and third switches 6, 7 to the cutoff condition. As a result, discharging of the second storage apparatus 22 is stopped and charging of the second storage apparatus 22 is started. Further, charging of the first storage apparatus 21 is stopped and discharging of the first storage apparatus 21 is started. Note that in all cases, the switch between power supply to the electric load 20 from the second storage apparatus 22 and power supply to the electric load 20 from the first storage apparatus 21 is performed instantaneously, and therefore the electric load 20 can receive a continuous power supply.

Figure 3:
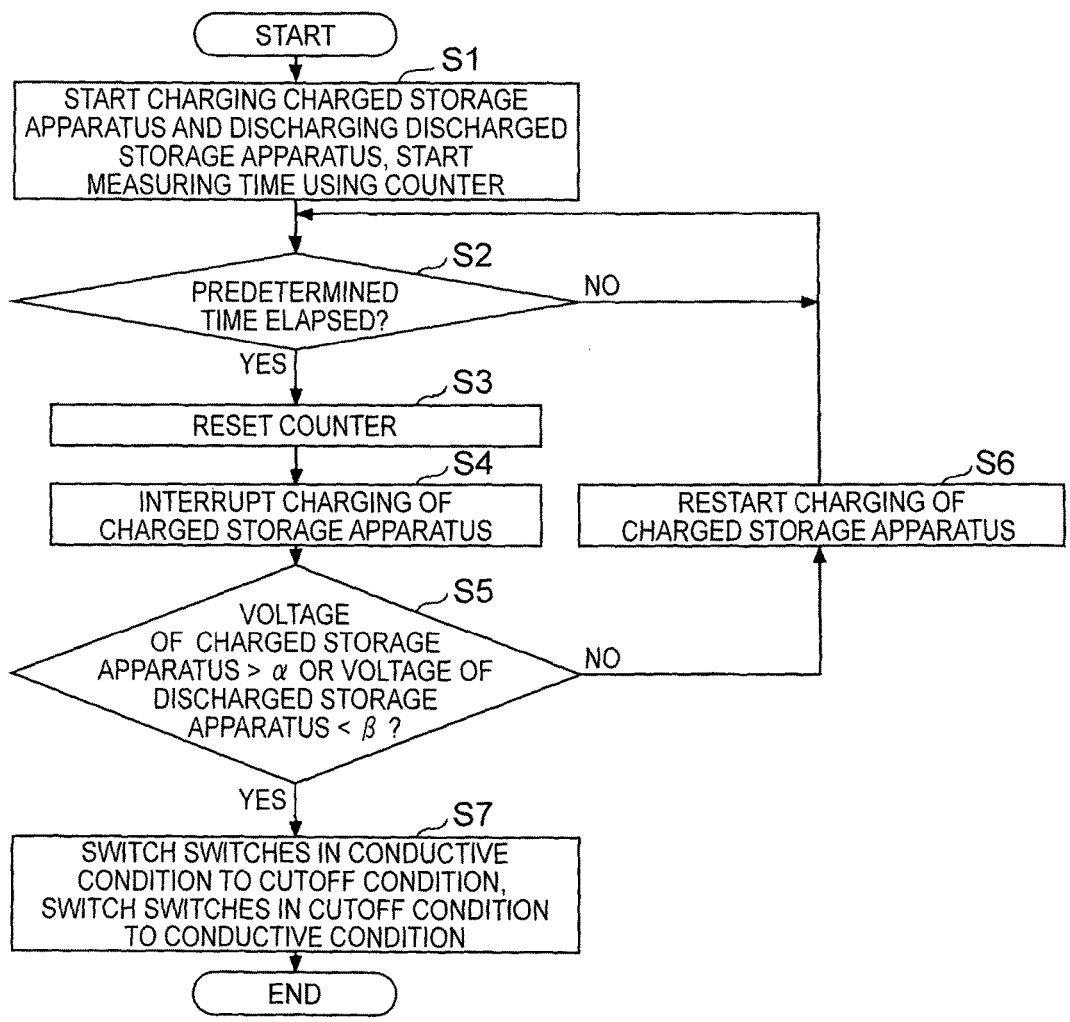
FIG. 3 is a flowchart showing a flow of first condition switching processing.

Here, referring to FIG. 3, processing (to be referred to hereafter as "first condition switching processing") performed by the first condition switching unit 11 to switch the operating condition of the multiport power supply apparatus 100 will be described. FIG. 3 is a flowchart showing a flow of the first condition switching processing. The control device 1 executes the first condition switching processing repeatedly at predetermined period intervals.

First, the control device 1 starts charging the charged storage apparatus, which is connected such that the power generated by the power generation apparatus 23 is charged thereto, starts discharging the discharged storage apparatus, which is connected so as to supply power to the electric load 20, and starts measuring time using a counter (step S1). Assuming in this case that the charged storage apparatus is the first storage apparatus 21 and the discharged storage apparatus is the second storage apparatus 22, the first and fourth switches 5, 8 are in the cutoff condition and the second and third switches 6, 7 are in the conductive condition. When, on the other hand, the charged storage apparatus is the second storage apparatus 22 and the discharged storage apparatus is the first storage apparatus 21, the first and fourth switches 5, 8 are in the conductive condition and the second and third switches 6, 7 are in the cutoff condition.

Next, the control device 1 determines whether or not a predetermined time has elapsed (step S2). When it is determined that the predetermined time has not elapsed (NO in step S2), the control device 1 continues to measure time using the counter until the predetermined time elapses.

When it is determined that the predetermined time has elapsed (YES in step S2), the control device 1 resets the counter (step S3) and interrupts charging of the charged storage apparatus (step S4). In so doing, the voltage of the charged storage apparatus can be detected more accurately. More specifically, when the charged storage apparatus is the first storage apparatus 21, the control device 1 interrupts charging of the first storage apparatus 21 by switching the second switch 6 to the cutoff condition. In so doing, the first voltage sensor 2 can detect the voltage of the first storage apparatus 21 more accurately. When, on the other hand, the charged storage apparatus is the second storage apparatus 22, the control device 1 interrupts charging of the second storage apparatus 22 by switching the fourth switch 8 to the cutoff condition. In so doing, the second voltage sensor 3 can detect the voltage of the second storage apparatus 22 more accurately.

Next, the charge-discharge condition determination unit 10 of the control device 1 determines whether or not the voltage of the charged storage apparatus exceeds the first predetermined value $\alpha$ or the voltage of the discharged storage apparatus is smaller than the second predetermined value $\beta$ (step S5). In other words, the charge-discharge condition determination unit 10 determines whether or not the charged storage apparatus is in the discharge necessary condition or the discharged storage apparatus is in the charging necessary condition.

When it is determined that the voltage of the charged storage apparatus is equal to or smaller than the first predetermined value $\alpha$ and the voltage of the discharged storage apparatus is equal to or larger than the second predetermined value $\beta$ (NO in step S5), the control device 1 restarts charging of the charged storage apparatus (step S6). More specifically, when the charged storage apparatus is the first storage apparatus 21, the control device 1 restarts charging of the first storage apparatus 21 by returning the second switch 6 to the conductive condition. When, on the other hand, the charged storage apparatus is the second storage apparatus 22, the control device 1 restarts charging of the second storage apparatus 22 by returning the fourth switch 8 to the conductive condition. The control device 1 then executes the processing of step S2 onward.

When it is determined that the voltage of the charged storage apparatus exceeds the first predetermined value α or the voltage of the discharged storage apparatus is smaller than the second predetermined value β (YES in step S5), on the other hand, the condition switching unit 11 of the control device 1 switches the switches in the conductive condition, from among the first to fourth switches 5 to 8, to the cutoff condition and switches the switches in the cutoff condition to the conductive condition (step S7). More specifically, when the charged storage apparatus is the first storage apparatus 21, the condition switching unit 11 switches the first and fourth switches 5, 8 to the conductive condition and switches the second and third switches 6, 7 to the cutoff condition. Alternatively, when the charged storage apparatus is the second storage apparatus 22, the condition switching unit 11 switches the first and fourth switches 5, 8 to the cutoff condition and switches the second and third switches 6, 7 to the conductive condition. As a result, the storage apparatus serving as the charged storage apparatus is switched to become the discharged storage apparatus, while the storage apparatus serving as the discharged storage apparatus is switched to become the charged storage apparatus. Thereafter, the control device 1 terminates the current first condition switching processing.

Figure 4:
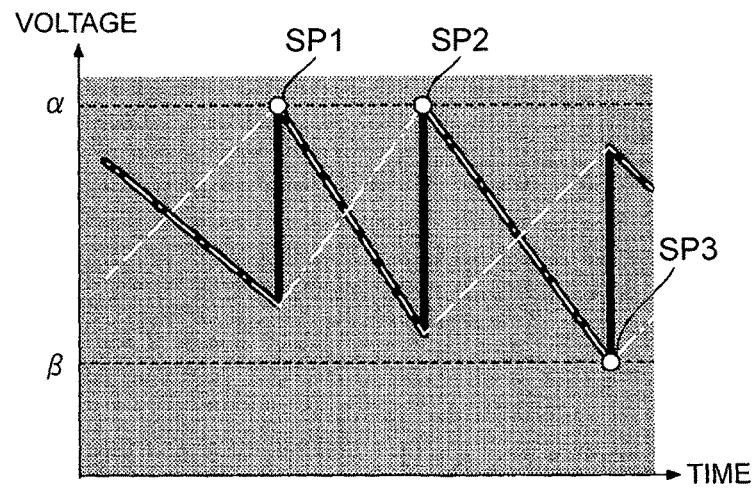
FIG. 4 is a graph showing transitions of voltages in input/output ports of the multiport power supply apparatus shown in FIG. 1.

Next, referring to FIG. 4, a transition of the voltage in the input/output port P1, or in other words a voltage applied to the electric load 20, during the first condition switching processing will be described. FIG. 4 is a graph showing transitions of the voltages in the input/output ports P1, P2, and P3, in which time is disposed on the abscissa and the voltage is disposed on the ordinate. Further, in FIG. 4, a transition indicated by a solid black line represents the transition of the voltage in the input/output port P1, a transition indicated by a dotted white line represents the transition of the voltage in the input/output port P2, and a transition indicated by a dot-dash white line represents the transition of the voltage in the input/output port P3. Furthermore, a point SP1 indicates a switch point at which the voltage in the input/output port P1 exceeds the first predetermined value α and the first storage apparatus 21 serving as the charged storage apparatus enters the discharge necessary condition. A point SP2 indicates a switch point at which the voltage in the input/output port P3 exceeds the first predetermined value α and the second storage apparatus 22 serving as the charged storage apparatus enters the discharge necessary condition. A point SP3 indicates a switch point at which the voltage in the input/output port P3 falls below the second predetermined value β and the second storage apparatus 22 serving as the discharged storage apparatus enters the charging necessary condition.

As shown in FIG. 4, when the charged storage apparatus enters the discharge necessary condition or the discharged storage apparatus enters the charging necessary condition, the multiport power supply apparatus 100 performs a switch such that the charged storage apparatus becomes the discharged storage apparatus and the discharged storage apparatus becomes the charged storage apparatus. More specifically, the multiport power supply apparatus 100 switches the conductive/cutoff condition of the combination of the first and fourth switches 5, 8 and the conductive/cutoff condition of the combination of the second and third switches 6, 7. In so doing, the multiport power supply apparatus 100 can maintain the voltage in the input/output port P1 at a voltage within the range extending from the second predetermined value β to the first predetermined value α.

In the multiport power supply apparatus 100 configured as described above, a charging circuit on which the power generation apparatus 23 charges the first storage apparatus 21 or the second storage apparatus 22 can be electrically separated from a power supply circuit on which the second storage apparatus 22 or the first storage apparatus 21 supplies power to the electric load 20 at low cost and without the use of a DC-DC converter. With the multiport power supply apparatus 100, therefore, an effect of a charging voltage on the electric load 20 can be suppressed. More specifically, when the electric load 20 includes a lamp, for example, flickering of the lamp due to voltage variation can be suppressed.

Further, in the multiport power supply apparatus 100, the charging circuit and the power supply circuit are electrically separated from each other, and therefore the first storage apparatus 21 and the second storage apparatus 22 can be charged to respectively desired voltages. Hence, with the multiport power supply apparatus 100, an increase in the lifespan of the first storage apparatus 21 and the second storage apparatus 22 can be realized. Furthermore, with the multiport power supply apparatus 100, a range of a generated voltage (the charging voltage) that can be used during charging control for charging the first storage apparatus 21 or the second storage apparatus 22 can be enlarged while regulating an engine load by varying the generated voltage in accordance with a condition of the vehicle.

Moreover, in the multiport power supply apparatus 100, a circuit on which the first storage apparatus 21 or the second storage apparatus 22 supplies power to the startup apparatus 24 is electrically separated from the circuit on which the second storage apparatus 22 or the first storage apparatus 21 supplies power to the electric load 20, and therefore an effect on the electric load 20 of a dip in the voltage during cranking by the startup apparatus 24 can be suppressed. Hence, the multiport power supply apparatus 100 can also be installed in a vehicle having an idling stop function, with which startup is performed frequently.

Furthermore, in the multiport power supply apparatus 100, since the circuit on which the first storage apparatus 21 or the second storage apparatus 22 supplies power to the startup apparatus 24 is electrically separated from the circuit on which the second storage apparatus 22 or the first storage apparatus 21 supplies power to the electric load 20, a flat battery caused by a dark current applied to the electric load 20 can be prevented. Moreover, with the multiport power supply apparatus 100, a situation in which startup cannot be performed by the startup apparatus 24 due to the flat battery can be prevented.

Figure 5:
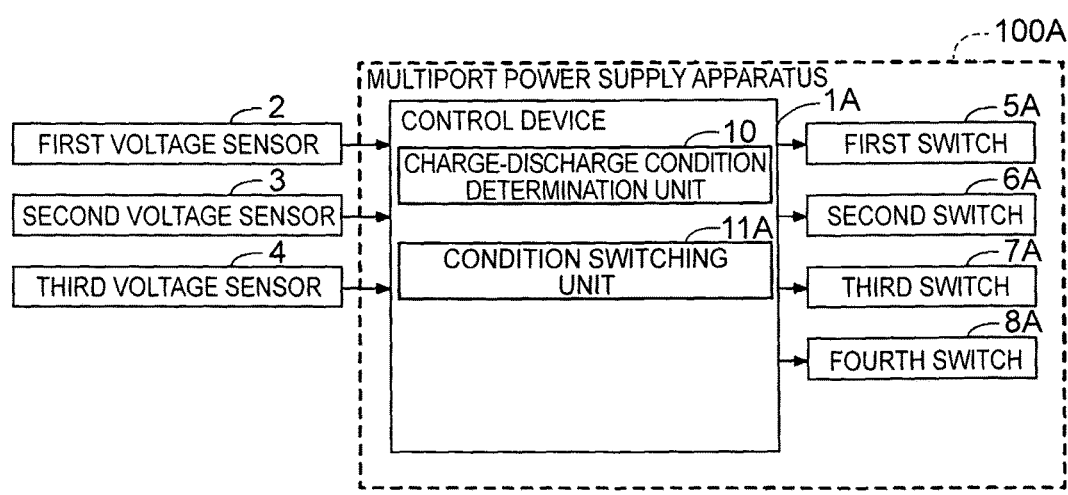
FIG. 5 is a functional block diagram showing an example of a configuration of a multiport power supply apparatus according to a second embodiment of the invention.
Figure 6:
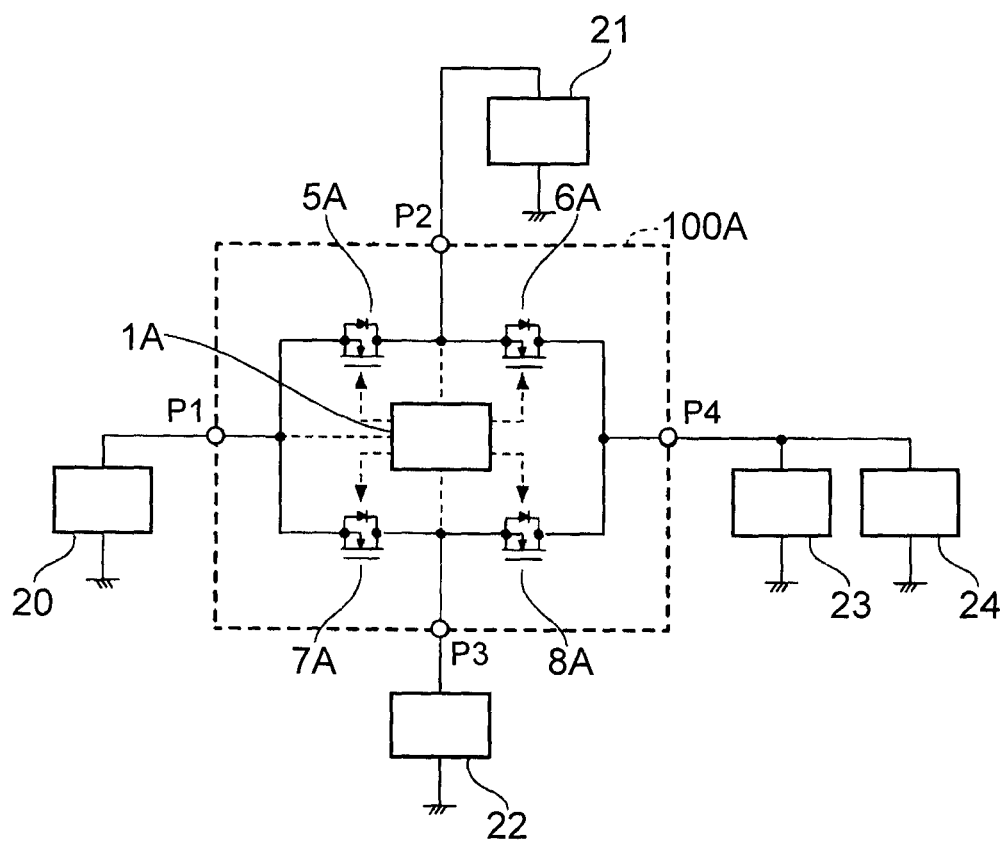
FIG. 6 is a schematic circuit diagram of a power supply system including the multiport power supply apparatus shown in FIG. 5.

Next, referring to FIGS. 5 to 8, a multiport power supply apparatus 100A according to a second embodiment of the invention will be described. FIG. 5 is a functional block diagram showing an example of a configuration of the multiport power supply apparatus 100A, and FIG. 6 is a schematic circuit diagram showing an example of a configuration of a power supply system including the multiport power supply apparatus 100A shown in FIG. 5.

The multiport power supply apparatus 100A is an in-vehicle apparatus installed in a vehicle that uses an engine, an electric motor, and so on as a drive source. In this embodiment, the multiport power supply apparatus 100A includes, as main constituent elements, a control device 1A, a first switch 5A, a second switch 6A, a third switch 7A, and a fourth switch 8A.

The four input/output ports P1 to P4, the first voltage sensor 2, the second voltage sensor 3, the charge-discharge condition determination unit 10, the electric load 20, the first storage apparatus 21, the second storage apparatus 22, the power generation apparatus 23, and the startup apparatus 24 are configured identically to their counterparts in the multiport power supply apparatus 100, and therefore description thereof has been omitted.

The control device 1A controls an operation of the multiport power supply apparatus 100A. In this embodiment, the control device 1A is a computer including a CPU, a RAM, a ROM, an input/output interface, and so on. The control device 1A reads programs corresponding to various functional elements such as the charge-discharge condition determination unit 10 and a condition switching unit 11A from the ROM or the RAM, and causes the CPU to execute processing corresponding to the various functional elements. More specifically, the control device 1A (condition switching unit 11A) executes calculations corresponding to the various functional elements after receiving outputs from the first voltage sensor 2, the second voltage sensor 3, a third voltage sensor 4, and so on, and controls the first switch 5A, the second switch 6A, the third switch 7A, the fourth switch 8A, and the like on the basis of results of the calculations.

The first to fourth switches 5A to 8A switch the electric circuits between the conductive condition and the cutoff condition. Specifically, the first to fourth switches 5A to 8A are constituted by switching elements configured to be switched between the conductive condition and the cutoff condition. In addition, a current that flows through the switch element, which constitutes each of the first to fourth switches 5A to 8A, in the conductive condition is controllable (variable). More specifically, the first to fourth switches 5A to 8A include, for example, a thyristor, a bipolar transistor, an insulated gate bipolar transistor (IGBT), a field-effect transistor (FET), and so on. Further, either a depression type switching element or an enhancement type switching element may be used. In this embodiment, a depression type metal-oxide semiconductor field-effect transistor (MOSFET) is used as the first to fourth switches 5A to 8A. Note that each of the second switch 6A and the fourth switch 8A may be constituted by a relay configured such that a current that flows through the relay in the conductive condition is not controllable.

The MOSFET serving as the first switch 5A uses the voltage of the input/output port P1 as a gate drive power supply. The MOSFET serving as the second switch 6A uses the voltage of the input/output port P2 as a gate drive power supply. The MOSFET serving as the third switch 7A uses the voltage of the input/output port P1 as a gate drive power supply. The MOSFET serving as the fourth switch 8A uses the voltage of the input/output port P3 as a gate drive power supply. Further, values of respective gate voltages of the first to fourth switches 5A to 8A are controlled from 0 V to a voltage value of the gate drive power supply by the control device 1A serving as a gate control circuit. In this embodiment, depression type MOSFETs are used, and therefore a conduction current (a drain current) increases as the value of the gate voltage decreases.

The third voltage sensor 4, similarly to the first voltage sensor 2 and the second voltage sensor 3, detects a voltage required to operate the multiport power supply apparatus 100A. In this embodiment, the third voltage sensor 4 is attached in order to detect a voltage of the input/output port P1. The third voltage sensor 4 detects the voltage of the input/output port P1 repeatedly at predetermined period intervals, and outputs a detected voltage value to the control device 1A.

The condition switching unit 11A switches the operating condition of the multiport power supply apparatus 100A. In this embodiment, the condition switching unit 11A switches the operating condition of the multiport power supply apparatus 100A on the basis of the determination result from the charge-discharge condition determination unit 10.

Specifically, the condition switching unit 11A switches the operating condition of the multiport power supply apparatus 100A when the charge-discharge condition determination unit 10 determines that at least one of the first storage apparatus 21 and the second storage apparatus 22 is not in the charge-discharge switch unnecessary condition. More specifically, the condition switching unit 11A switches the charging-related switch that is in the conductive condition, from among the first to fourth switches 5A to 8A, to the cutoff condition. Further, the condition switching unit 11A switches the discharge-related switch that is in the cutoff condition, from among the first to fourth switches 5A to 8A, gradually to the conductive condition, and when the switch reaches a predetermined conductive condition, switches the discharge-related switch in the conductive condition to the cutoff condition and switches the charging-related switch in the cutoff condition to the conductive condition.

For example, a case in which the first switch 5A and the fourth switch 8A are in the conductive condition while the second switch 6A and the third switch 7A are in the cutoff condition may be envisaged. In this case, the first storage apparatus 21 is currently being discharged, or in other words the first storage apparatus 21 is supplying power to the electric load 20, and the second storage apparatus 22 is currently being charged, or in other words the power generation apparatus 23 is supplying power to the second storage apparatus 22.

In this case, when the voltage of the second storage apparatus 22 being charged exceeds the first predetermined value $\alpha$, the condition switching unit 11A determines that the second storage apparatus 22 is in the discharge necessary condition. Accordingly, the condition switching unit 11A switches the fourth switch 8A to the cutoff condition while keeping the first switch 5A in the conductive condition. The condition switching unit 11A then gradually reduces the gate voltage of the third switch 7A, which is set at the voltage value of the input/output port P1, to 0 V in increments of a predetermined value $\Delta V$ such that the drain current of the third switch 7A gradually increases. As a result, charging of the second storage apparatus 22 is stopped and discharging thereof is started. Then, when the voltage in the input/output port P1 starts to increase due to the increase in the drain current of the third switch 7A, the condition switching unit 11A switches the first switch 5A to the cutoff condition and switches the second switch 6A to the conductive condition. As a result, discharging of the first storage apparatus 21 is stopped and charging thereof is started. Note that the increase in the voltage of the input/output port P1 is detected by the third voltage sensor 4.

Further, when the voltage of the first storage apparatus 21 being discharged falls below the second predetermined value $\beta$, the condition switching unit 11A determines that the first storage apparatus 21 is in the charging necessary condition. Accordingly, the condition switching unit 11A executes identical processing to that of the case described above, in which the second storage apparatus 22 is determined to be in the discharge necessary condition. As a result, discharging of the first storage apparatus 21 is stopped and charging thereof is started. Further, charging of the second storage apparatus 22 is stopped and discharging thereof is started.

Note that in all cases, the switch between power supply to the electric load 20 from the first storage apparatus 21 and power supply to the electric load 20 from the second storage apparatus 22 is performed in a short overlap period, and therefore the electric load 20 can receive a continuous power supply.

Here, referring to FIG. 7, processing (to be referred to hereafter as "second condition switching processing") performed by the first condition switching unit 11A to switch the operating condition of the multiport power supply apparatus 100A will be described. FIG. 7 is a flowchart showing a flow of the second condition switching processing. The control device 1A executes the second condition switching processing repeatedly at predetermined period intervals. Steps S11 to S16 in FIG. 7 are identical to steps S1 to S6 in FIG. 3. Therefore, description of steps S11 to S16 has been omitted, and detailed description is provided from step S17 onward.

In step S17, or in other words when it is determined that the charged storage apparatus is in the discharge necessary condition or the discharged storage apparatus is in the charging necessary condition, the condition switching unit 11A of the control device 1A stops charging of the charged storage apparatus. More specifically, when the charged storage apparatus is the first storage apparatus 21, the condition switching unit 11A stops charging of the first storage apparatus 21 by switching the second switch 6A to the cutoff condition. As a result, voltage variation in the power generation apparatus 23 is prevented from affecting the electric load 20 via the second switch 6A and the first switch 5A. Note that in this case, the fourth switch 8A is in the cutoff condition.

Alternatively, when the charged storage apparatus is the second storage apparatus 22, the condition switching unit 11A stops charging of the second storage apparatus 22 by switching the fourth switch 8A to the cutoff condition. As a result, voltage variation in the power generation apparatus 23 is prevented from affecting the electric load 20 via the fourth switch 8A and the third switch 7A. Note that in this case, the second switch 6A is in the cutoff condition.

Next, the control device 1A reduces the gate voltage of the discharge side switch in the cutoff condition (the first switch 5A or the third switch 7A) by the predetermined value ΔV (step S18). More specifically, when the charged storage apparatus is the first storage apparatus 21, the control device 1A reduces the gate voltage of the first switch 5A, the discharge side switch in the cutoff condition, by ΔV. As a result, the drain current flowing through the first switch 5A is increased. Alternatively, when the charged storage apparatus is the second storage apparatus 22, the control device 1A reduces the gate voltage of the third switch 7A, the discharge side switch in the cutoff condition, by ΔV. As a result, the drain current flowing through the third switch 7A is increased.

Next, the control device 1A determines whether or not the voltage in the input/output port P1 has increased on the basis of the output of the third voltage sensor 4 (step S19). Having determined that the voltage in the input/output port P1 has not increased (NO in step S19), the control device 1A returns the processing to step S18 to reduce the gate voltage of the discharge side switch in the cutoff condition further by ΔV. The control device 1A repeats the processing of steps S18 and S19 until the voltage in the input/output port P1 is determined to have increased.

Having determined that the voltage in the input/output port P1 has increased (YES in step S19), the condition switching unit 11A switches the discharge side switch in the conductive condition to the cutoff condition (step S20). More specifically, when the charged storage apparatus is the first storage apparatus 21, the condition switching unit 11A switches the third switch 7A, the discharge side switch in the conductive condition, to the cutoff condition. As a result, the second storage apparatus 22 serving as the discharged storage apparatus is disconnected from the electric load 20 so that the second storage apparatus 22 can be charged. Alternatively, when the charged storage apparatus is the second storage apparatus 22, the condition switching unit 11A switches the first switch 5A, the discharge side switch in the conductive condition, to the cutoff condition. As a result, the first storage apparatus 21 serving as the discharged storage apparatus is disconnected from the electric load 20 so that the first storage apparatus 21 can be charged.

Next, the condition switching unit 11A starts charging of the storage apparatus that was initially the discharged storage apparatus (step S21). More specifically, when the charged storage apparatus was initially the first storage apparatus 21, the condition switching unit 11A starts charging of the second storage apparatus 22 that was initially the discharged storage apparatus by switching the fourth switch 8A to the conductive condition. Alternatively, when the charged storage apparatus was initially the second storage apparatus 22, the condition switching unit 11A starts charging of the first storage apparatus 21 that was initially the discharged storage apparatus by switching the second switch 6A to the conductive condition.

Next, the control device 1A determines whether or not the gate voltage of the discharge side switch that was initially in the cutoff condition has reached a conduction voltage (0 V, for example) on the basis of the output of the third voltage sensor 4 (step S22). More specifically, when the charged storage apparatus was initially the first storage apparatus 21, the condition switching unit 11A determines whether or not the gate voltage of the first switch 5A that was initially the discharge side switch in the cutoff condition has reached the conduction voltage. Alternatively, when the charged storage apparatus was initially the second storage apparatus 22, the condition switching unit 11A determines whether or not the gate voltage of the third switch 7A that was initially the discharge side switch in the cutoff condition has reached the conduction voltage. Note that the conduction voltage is a gate voltage realized when the drain current is at a maximum.

Having determined that the gate voltage of the discharge side switch initially in the cutoff condition has not reached the conduction voltage (NO in step S22), the control device 1A reduces the gate voltage of the discharge side switch initially in the cutoff condition further by the predetermined value ΔV (step S23). The control device 1A then repeats the processing of steps S22 and S23 until the gate voltage of the discharge side switch initially in the cutoff condition reaches the conduction voltage.

Having determined that the gate voltage of the discharge side switch initially in the cutoff condition has reached the conduction voltage (YES in step S22), the control device 1A terminates the current second condition switching processing.

Figure 8A:
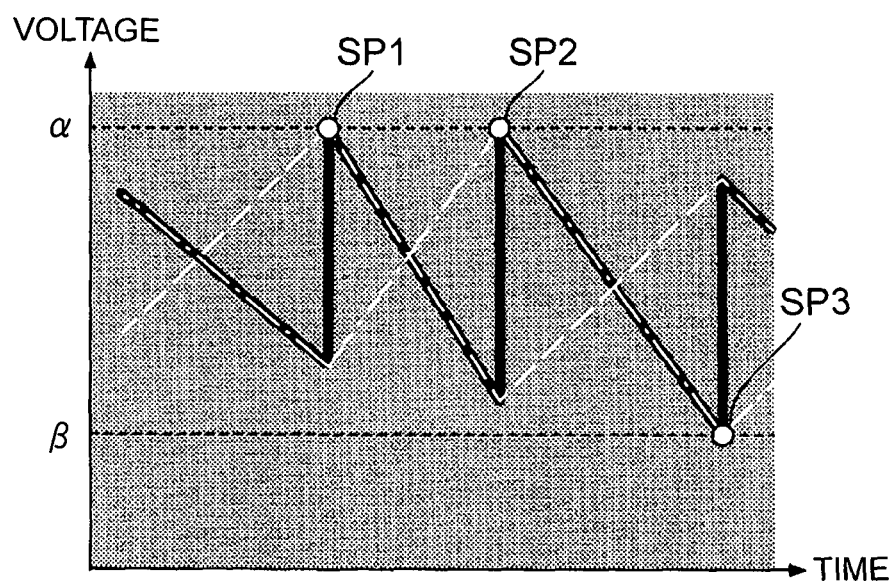
FIGS. 8A and 8B are graphs showing transitions of voltages in input/output ports of the multiport power supply apparatus shown in FIG. 5.
Figure 8B:
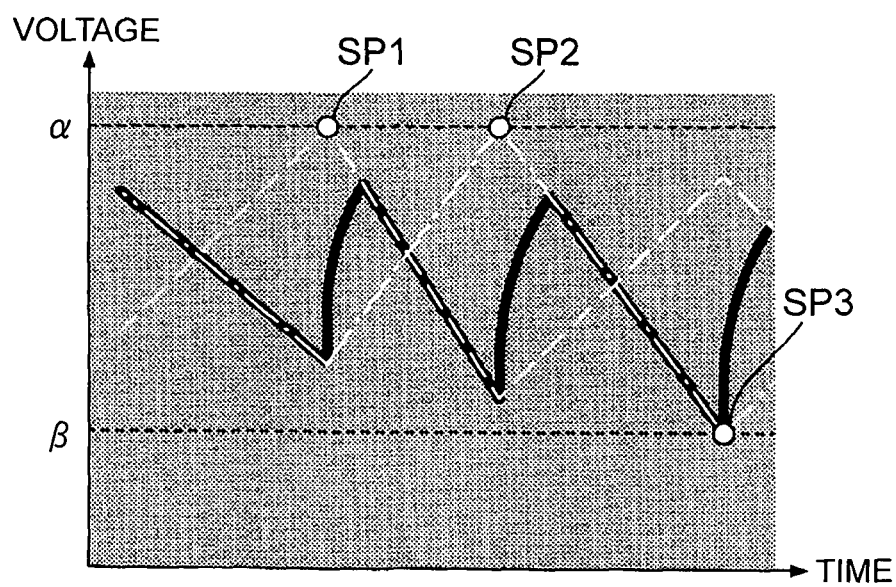

Next, referring to FIGS. 8A and 8B, a transition of the voltage in the input/output port P1, or in other words the voltage applied to the electric load 20, during the second condition switching processing will be described. FIGS. 8A and 8B are graphs respectively showing transitions of the voltages in the input/output ports P1, P2, and P3, in which time is disposed on the abscissa and the voltage is disposed on the ordinate. FIG. 8A is an identical graph to FIG. 4, and shows the transitions of the voltages in the input/output ports P1, P2, and P3 during the first condition switching processing for comparison with FIG. 8B. Further, in FIGS. 8A and 8B, a transition indicated by a solid black line represents the transition of the voltage in the input/output port P1, a transition indicated by a dotted white line represents the transition of the voltage in the input/output port P2, and a transition indicated by a dot-dash white line represents the transition of the voltage in the input/output port P3. Furthermore, the point SP1 indicates the switch point at which the voltage in the input/output port P1 exceeds the first predetermined value α and the first storage apparatus 21 serving as the charged storage apparatus enters the discharge necessary condition. The point SP2 indicates the switch point at which the voltage in the input/output port P3 exceeds the first predetermined value α and the second storage apparatus 22 serving as the charged storage apparatus enters the discharge necessary condition. The point SP3 indicates the switch point at which the voltage in the input/output port P3 falls below the second predetermined value β and the second storage apparatus 22 serving as the discharged storage apparatus enters the charging necessary condition.

As shown in FIG. 8B, when the charged storage apparatus enters the discharge necessary condition or the discharged storage apparatus enters the charging necessary condition, the multiport power supply apparatus 100A performs a switch such that the charged storage apparatus becomes the discharged storage apparatus and the discharged storage apparatus becomes the charged storage apparatus. More specifically, the multiport power supply apparatus 100A switches the conductive/cutoff condition of the combination of the first and fourth switches 5A, 8A and the conductive/cutoff condition of the combination of the second and third switches 6A, 7A. As a result, the multiport power supply apparatus 100A can maintain the voltage in the input/output port P1 at a voltage within the range extending from the second predetermined value β to the first predetermined value α.

Further, as shown in FIG. 8B, voltage variation occurring in the input/output port P1 during the switch performed by the multiport power supply apparatus 100A is gentler than the voltage variation caused by the multiport power supply apparatus 100 shown in FIG. 8A. The reason for this is that the current flowing to the electric load 20 from the storage apparatus that was initially the charged storage apparatus can be increased gradually by the switching element configured such that the current that flows through the switching element in the conductive condition is controllable. As a result, the multiport power supply apparatus 100A is capable of suppressing rapid voltage variation in the input/output port P1 during a charge-discharge switch.

With the multiport power supply apparatus 100A thus configured, in addition to the effects of the multiport power supply apparatus 100 described above, rapid variation in the voltage applied to the electric load 20 during a charge-discharge switch can be suppressed. Therefore, when the electric load 20 includes a lamp, for example, the multiport power supply apparatus 100A can suppress flickering of the lamp caused by voltage variation during a charge-discharge switch even further.

Moreover, the condition switching unit 11A gradually increases the drain current by gradually reducing the gate voltage of a depression type field-effect transistor (MOSFET) in increments of the predetermined value ΔV. The invention is not limited thereto, however, and instead, the condition switching unit 11A may gradually increase the drain current by gradually increasing the gate voltage of an enhancement type field-effect transistor (MOSFET) in increments of the predetermined value ΔV.

Furthermore, in the above embodiments, the multiport power supply apparatus 100, 100A supplies power to the electric load 20 continuously by charging one of the two storage apparatuses while discharging the other. The invention is not limited thereto, however, and instead, the multiport power supply apparatus 100, 100A may supply power to the electric load 20 continuously by charging one or a plurality of three or more storage apparatuses while discharging another storage apparatus.

Figure 9:
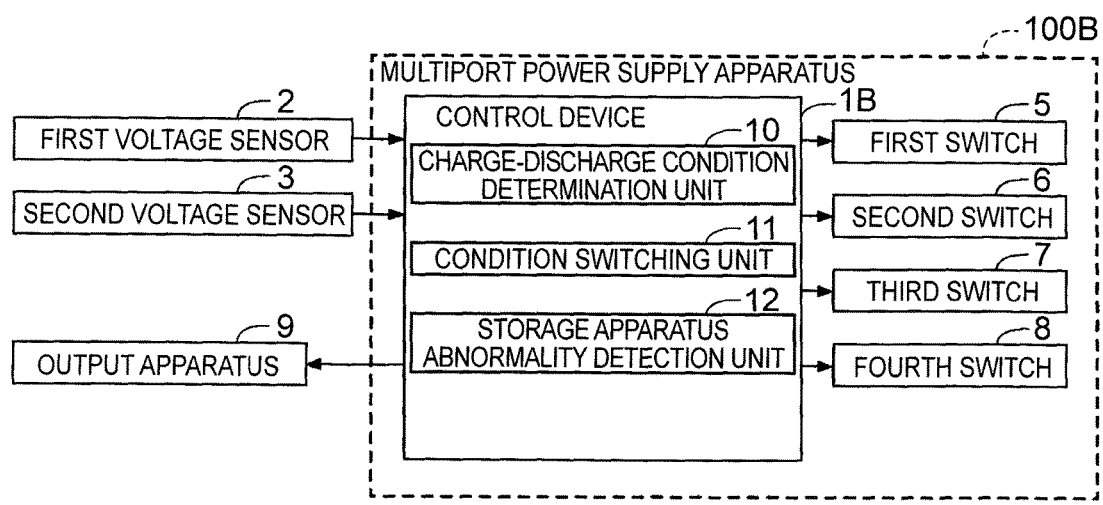
FIG. 9 is a functional block diagram showing an example of a configuration of a multiport power supply apparatus according to a third embodiment of the invention.

Next, referring to FIG. 9, a multiport power supply apparatus 100B according to a third embodiment of the invention will be described. FIG. 9 is a functional block diagram showing an example of a configuration of the multiport power supply apparatus 100B.

The multiport power supply apparatus 100B is an in-vehicle apparatus installed in a vehicle that uses an engine, an electric motor, and so on as a drive source. The multiport power supply apparatus 100B is configured identically to the multiport power supply apparatus 100 apart from configurations of an output apparatus 9 and a storage apparatus abnormality detection unit 12, and therefore description of identical parts has been omitted. Further, a power supply system including the multiport power supply apparatus 100B shown in FIG. 9 is identical to the power supply system shown in FIG. 2 except that a control device 1B and the power generation apparatus 23 are connected by a signal line, and therefore a schematic circuit diagram of the power supply system has been omitted.

The control device 1B controls an operation of the multiport power supply apparatus 100B. In this embodiment, the control device 1B is a computer including a CPU, a RAM, a ROM, an input/output interface, and so on. The control device 1B reads programs corresponding to various functional elements such as the charge-discharge condition determination unit 10, the condition switching unit 11, and the storage apparatus abnormality detection unit 12 from the ROM or the RAM, and causes the CPU to execute processing corresponding to the various functional elements. More specifically, the control device 1B (i.e., the condition switching unit 11 and the storage apparatus abnormality detection unit 12) executes calculations corresponding to the various functional elements after receiving outputs from the first voltage sensor 2, the second voltage sensor 3, and so on, and controls the first switch 5, the second switch 6, the third switch 7, the fourth switch 8, the output apparatus 9, and the like on the basis of results of the calculations.

The output apparatus 9 outputs various information, and includes, for example, an audio output apparatus such as an in-vehicle speaker or a buzzer, a display apparatus such as an in-vehicle display or an LED lamp, and a vibration apparatus such as a seat vibrator or a steering wheel vibrator. In this embodiment, the output apparatus 9 is an in-vehicle display that displays various information in accordance with control signals output by the control device 1B.

The storage apparatus abnormality detection unit 12 detects abnormalities in the storage apparatuses connected to the multiport power supply apparatus 100B. In this embodiment, the storage apparatus abnormality detection unit 12 detects abnormalities in the first storage apparatus 21 and the second storage apparatus 22.

Specifically, the storage apparatus abnormality detection unit 12 obtains the voltage of a storage apparatus subjected to an abnormality detection when the abnormality detection subject storage apparatus is disconnected from the power generation apparatus 23, and detects an abnormality in the storage apparatus on the basis of the obtained voltage. Note that the storage apparatus abnormality detection unit 12 may obtain the voltage of the abnormality detection subject storage apparatus after the storage apparatus has been charged for a predetermined period. In so doing, an abnormality in the storage apparatus can be detected more easily by determining that the voltage of the storage apparatus has not varied, or in other words that the storage apparatus has not been charged, despite the attempt to charge the storage apparatus.

More specifically, the storage apparatus abnormality detection unit 12 determines that an abnormality has occurred in the abnormality detection subject storage apparatus when the voltage of the storage apparatus is smaller than a third predetermined value $\gamma$. The third predetermined value $\gamma$ is equal to or smaller than the second predetermined value $\beta$ described above, but may be varied in accordance with the type of the storage apparatus.

After determining that an abnormality has occurred in the storage apparatus, the storage apparatus abnormality detection unit 12 switches the switches so that another storage apparatus in which an abnormality has not been detected, the electric load 20, and the power generation apparatus 23 are electrically connected. In so doing, the other storage apparatus in which an abnormality has not been detected can be charged while ensuring that power can be supplied continuously to the electric load 20 from either the other storage apparatus in which an abnormality has not been detected or the power generation apparatus 23. Further, the storage apparatus abnormality detection unit 12 outputs a control signal to the power generation apparatus 23 to control the power generation apparatus 23 such that the generated voltage of the power generation apparatus 23 remains within a predetermined range. For example, the predetermined range is a range extending from the second predetermined value $\beta$ (12 V, for example) to the first predetermined value $\alpha$ (13 V, for example). As a result, an excessively large voltage is not applied to the electric load 20.

Figure 10:
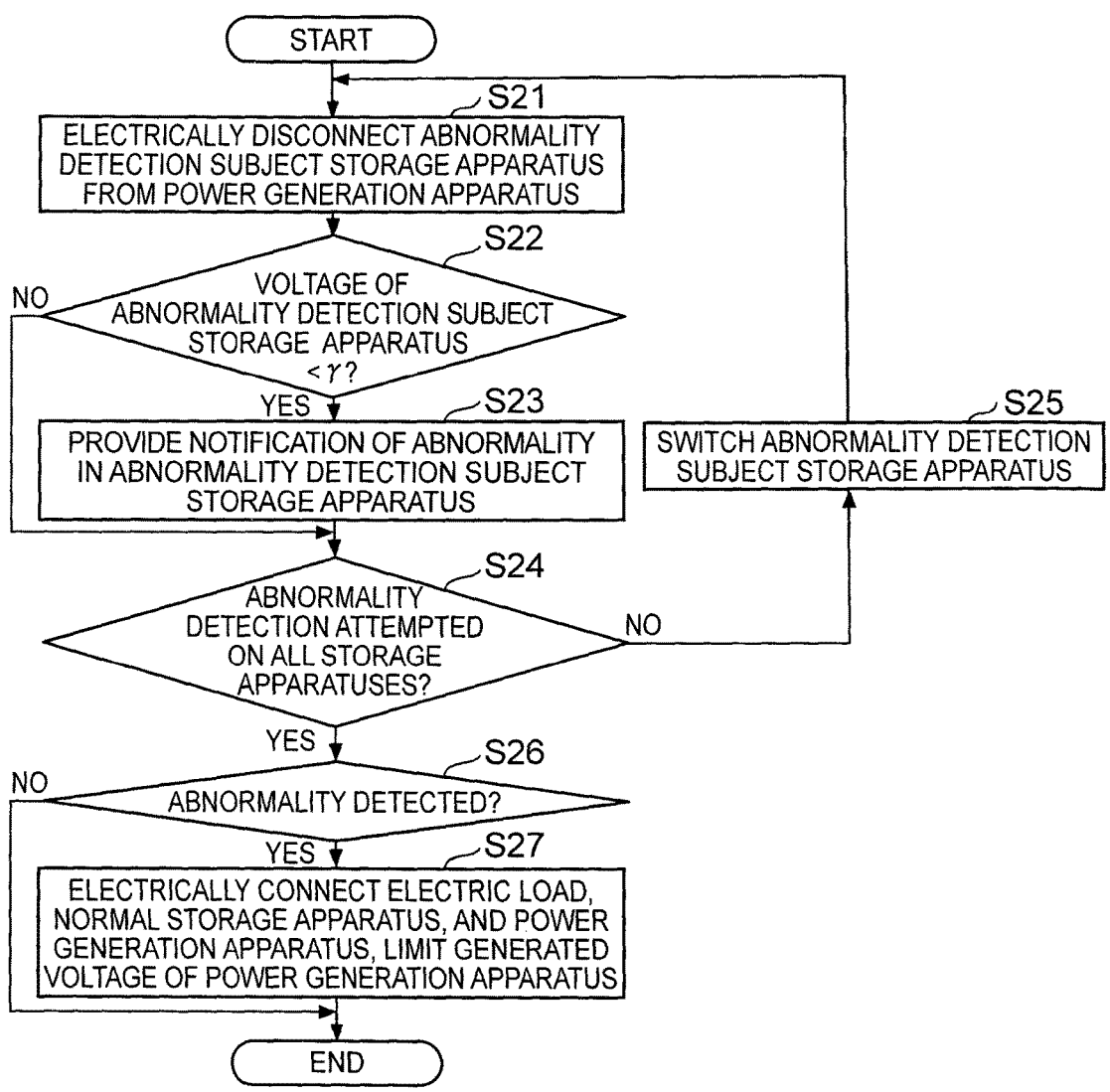
FIG. 10 is a flowchart showing a flow of storage apparatus abnormality detection processing.

Here, referring to FIG. 10, processing (to be referred to hereafter as "storage apparatus abnormality detection processing") performed by the storage apparatus abnormality detection unit 12 to detect an abnormality in the storage apparatus will be described. FIG. 10 is a flowchart showing a flow of the storage apparatus abnormality detection processing. The control device 1B executes the storage apparatus abnormality detection process repeatedly at predetermined period intervals. Note that the control device 1B may execute the storage apparatus abnormality detection processing at a predetermined timing such as after charging has been performed for a predetermined period on the abnormality detection subject storage apparatus, for example.

First, the storage apparatus abnormality detection unit 12 of the control device 1B electrically disconnects the abnormality detection subject storage apparatus from the power generation apparatus 23 (step S21).

More specifically, when the abnormality detection subject storage apparatus is the first storage apparatus 21, the storage apparatus abnormality detection unit 12 electrically disconnects the first storage apparatus 21 from the power generation apparatus 23 by switching the second switch 6 to the cutoff condition. In so doing, the voltage of the first storage apparatus 21 can be detected without being affected by the generated voltage of the power generation apparatus 23. Note that in this case, the first and fourth switches 5, 8 are in the cutoff condition, while the third switch 7 is in the conductive condition. Hence, the electric load 20 and the first storage apparatus 21 are electrically disconnected while ensuring that power can be supplied continuously from the second storage apparatus 22 to the electric load 20.

Alternatively, when the abnormality detection subject storage apparatus is the second storage apparatus 22, the storage apparatus abnormality detection unit 12 electrically disconnects the second storage apparatus 22 from the power generation apparatus 23 by switching the fourth switch 8 to the cutoff condition. In so doing, the voltage of the second storage apparatus 22 can be detected without being affected by the generated voltage of the power generation apparatus 23. Note that in this case, the first switch 5 is in the conductive condition, while the second and third switches 6, 7 are in the cutoff condition. Hence, the electric load 20 and the second storage apparatus 22 are electrically disconnected while ensuring that power can be supplied continuously from the first storage apparatus 21 to the electric load 20.

Next, the storage apparatus abnormality detection unit 12 determines whether or not the voltage of the abnormality detection subject storage apparatus is smaller than the third predetermined value $\gamma$ on the basis of the output of the first voltage sensor 2 or the second voltage sensor 3 (step S22).

More specifically, when the abnormality detection subject storage apparatus is the first storage apparatus 21, the storage apparatus abnormality detection unit 12 determines whether or not the voltage of the first storage apparatus 21 is smaller than the third predetermined value $\gamma$ on the basis of the output of the first voltage sensor 2.

Alternatively, when the abnormality detection subject storage apparatus is the second storage apparatus 22, the storage apparatus abnormality detection unit 12 determines whether or not the voltage of the second storage apparatus 22 is smaller than the third predetermined value $\gamma$ on the basis of the output of the second voltage sensor 3.

After determining that the voltage of the abnormality detection subject storage apparatus is smaller than the third predetermined value $\gamma$ (YES in step S22), the storage apparatus abnormality detection unit 12 outputs a control signal to the output apparatus 9 such that a message indicating that an abnormality has been detected in the abnormality detection subject storage apparatus is displayed on the in-vehicle display (step S23).

After determining that the voltage of the abnormality detection subject storage apparatus is equal to or larger than the third predetermined value $\gamma$ (NO in step S22), on the other hand, the storage apparatus abnormality detection unit 12 executes step S24 without outputting a control signal to the output apparatus 9.

Next, the storage apparatus abnormality detection unit 12 determines whether or not abnormality detection has been performed on all of the storage apparatuses (step S24). When it is determined that abnormality detection has not been performed on all of the storage apparatuses (NO in step S24), the storage apparatus abnormality detection unit 12 switches the abnormality detection subject storage apparatus to another storage apparatus (step S25) and then executes the processing of step S21 onward. When it is determined that abnormality detection has been performed on all of the storage apparatuses (YES in step S24), the storage apparatus abnormality detection unit 12 determines whether or not an abnormality has been detected in any of the storage apparatuses (step S26).

When it is determined that an abnormality has been detected in one of the storage apparatuses (YES in step S26), the storage apparatus abnormality detection unit 12 electrically connects the electric load 20, the normal storage apparatus, and the power generation apparatus 23, and controls the generated voltage of the power generation apparatus 23 to the predetermined range (step S27).

More specifically, when it is determined that an abnormality has been detected in only the first storage apparatus 21, the storage apparatus abnormality detection unit 12 switches the first and second switches 5, 6 to the cutoff condition and switches the third and fourth switches 7, 8 to the conductive condition. In so doing, the storage apparatus abnormality detection unit 12 electrically connects the electric load 20, the second storage apparatus 22, and the power generation apparatus 23. As a result, the second storage apparatus 22, in which an abnormality has not been detected, can be charged with the generated voltage of the power generation apparatus 23 while ensuring that power can be supplied continuously to the electric load 20 from either the second storage apparatus 22 or the power generation apparatus 23. The storage apparatus abnormality detection unit 12 also controls the generated voltage of the power generation apparatus 23 to the predetermined range. In so doing, an excessively large voltage is not applied to the electric load 20.

Alternatively, when it is determined that an abnormality has been detected in only the second storage apparatus 22, the storage apparatus abnormality detection unit 12 switches the first and second switches 5, 6 to the conductive condition and switches the third and fourth switches 7, 8 to the cutoff condition. In so doing, the storage apparatus abnormality detection unit 12 electrically connects the electric load 20, the first storage apparatus 21, and the power generation apparatus 23. As a result, the first storage apparatus 21, in which an abnormality has not been detected, can be charged with the generated voltage of the power generation apparatus 23 while ensuring that power can be supplied continuously to the electric load 20 from either the first storage apparatus 21 or the power generation apparatus 23. The storage apparatus abnormality detection unit 12 also controls the generated voltage of the power generation apparatus 23 to the predetermined range. In so doing, an excessively large voltage is not applied to the electric load 20.

In a case where an abnormality is detected in one or a plurality of storage apparatuses, the storage apparatus abnormality detection unit 12 does not have to connect the power generation apparatus 23 to the normal storage apparatus connected to the electric load 20 as long as a plurality of normal storage apparatuses exist. The reason for this is that the operating condition of the multiport power supply apparatus 100B can continue to be switched by the condition switching unit 11 while using the plurality of normal storage apparatuses in sequence as the charged storage apparatus or the discharged storage apparatus.

Further, after detecting an abnormality in one storage apparatus, the storage apparatus abnormality detection unit 12 may electrically connect the electric load 20, another storage apparatus, and the power generation apparatus 23 and control the generated voltage of the power generation apparatus 23 to the predetermined range without performing abnormality detection on any of the remaining storage apparatuses.

Thus, the storage apparatus abnormality detection unit 12 determines the occurrence of an abnormality in the abnormality detection subject storage apparatus on the basis of the voltage of the abnormality detection subject storage apparatus after disconnecting the abnormality detection subject storage apparatus from the power generation apparatus 23. As a result, the storage apparatus abnormality detection unit 12 can determine the occurrence of an abnormality in the storage apparatus accurately.

Further, the storage apparatus abnormality detection unit 12 determines the occurrence of an abnormality in the abnormality detection subject storage apparatus on the basis of whether or not a voltage condition to be established in the storage apparatus when normal is actuary established. As a result, the storage apparatus abnormality detection unit 12 can determine the occurrence of an abnormality in the storage apparatus accurately.

Furthermore, even when the storage apparatus abnormality detection unit 12 detects an abnormality in one or a plurality of storage apparatuses, the operation of the multiport power supply apparatus 100B can be continued as long as at least one storage apparatus is normal. In other words, power can be supplied continuously to the electric load 20 from the normal storage apparatus.

Figure 11:
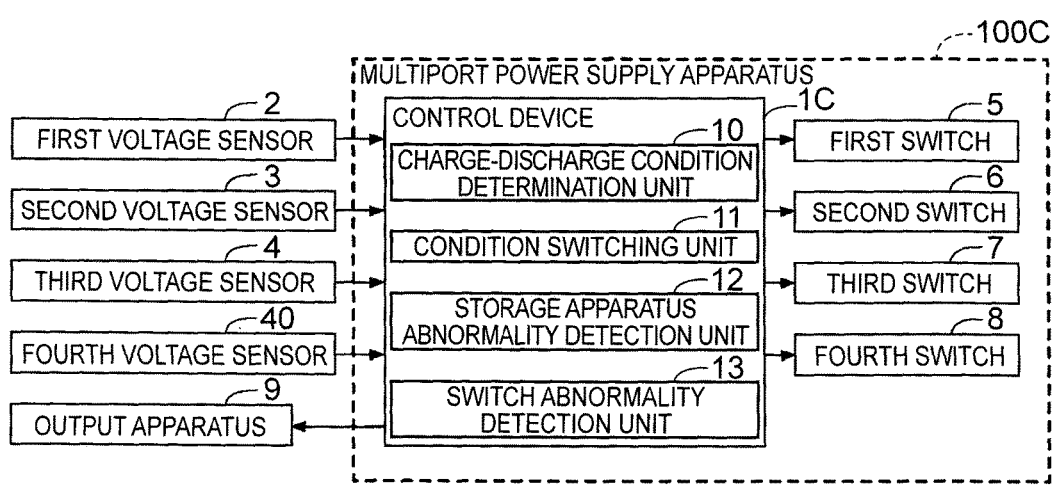
FIG. 11 is a functional block diagram showing an example of a configuration of a multiport power supply apparatus according to a fourth embodiment of the invention.

Next, referring to FIG. 11, a multiport power supply apparatus 100C according to a fourth embodiment of the invention will be described. FIG. 11 is a functional block diagram showing an example of a configuration of the multiport power supply apparatus 100C.

The multiport power supply apparatus 100C is an in-vehicle apparatus installed in a vehicle that uses an engine, an electric motor, and so on as a drive source. The multiport power supply apparatus 100C is configured identically to the multiport power supply apparatus 100B apart from configurations of the third voltage sensor 4, a fourth voltage sensor 40, and a switch abnormality detection unit 13, and therefore description of identical parts has been omitted. Further, a power supply system including the multiport power supply apparatus 100C shown in FIG. 11 is identical to the power supply system including the multiport power supply apparatus 100B, and therefore a schematic circuit diagram of the power supply system has been omitted.

A control device 1C controls an operation of the multiport power supply apparatus 100C. In this embodiment, the control device 1C is a computer including a CPU, a RAM, a ROM, an input/output interface, and so on. The control device 1C reads programs corresponding to various functional elements such as the charge-discharge condition determination unit 10, the condition switching unit 11, the storage apparatus abnormality detection unit 12, and the switch abnormality detection unit 13 from the ROM or the RAM, and causes the CPU to execute processing corresponding to the various functional elements. More specifically, the control device 1C (i.e., the condition switching unit 11, the storage apparatus abnormality detection unit 12, and the switch abnormality detection unit 13) executes calculations corresponding to the various functional elements after receiving outputs from the first voltage sensor 2, the second voltage sensor 3, the third voltage sensor 4, the fourth voltage sensor 40, and so on, and controls the first switch 5, the second switch 6, the third switch 7, the fourth switch 8, the output apparatus 9, and the like on the basis of results of the calculations.

The third voltage sensor 4 and the fourth voltage sensor 40, similarly to the first voltage sensor 2 and the second voltage sensor 3, detect voltages required to operate the multiport power supply apparatus 100C. In this embodiment, the third voltage sensor 4 is attached in order to detect the voltage of the input/output port P1. The third voltage sensor 4 detects the voltage of the input/output port P1 repeatedly at predetermined period intervals, and outputs a detected voltage value to the control device 1C. Further, the fourth voltage sensor 40 is attached in order to detect the voltage of the input/output port P4. The fourth voltage sensor 40 detects the voltage of the input/output port P4 repeatedly at predetermined period intervals, and outputs a detected voltage value to the control device 1C.

The switch abnormality detection unit 13 detects an abnormality in a switch constituting the multiport power supply apparatus 100C. In this embodiment, the switch abnormality detection unit 13 detects an abnormality in at least one of the first switch 5, the second switch 6, the third switch 7, and the fourth switch 8.

Specifically, the switch abnormality detection unit 13 sets the generated voltage of the power generation apparatus 23 at a higher value than the voltages of all of the storage apparatuses.

The switch abnormality detection unit 13 then obtains the voltage of the input/output port P1 to which the electric load 20 is connected, the voltage (to be referred to hereafter as the "charged storage apparatus voltage") of the input/output port to which the charged storage apparatus is connected, the voltage (to be referred to hereafter as the "discharged storage apparatus voltage") of the input/output port to which the discharged storage apparatus is connected, and the voltage of the input/output port P4 to which the power generation apparatus 23 is connected, and detects an abnormality in the switch on the basis of the obtained voltages.

More specifically, the switch abnormality detection unit 13 determines that an abnormality has not occurred in the switch when the voltage of the input/output port P1 is equal to the charged storage apparatus voltage, the discharged storage apparatus voltage is equal to the voltage of the input/output port P4, and the voltage of the input/output port P1 differs from the voltage of the input/output port P4. In other words, the switch abnormality detection unit 13 determines that an abnormality has occurred in the switch when the voltage of the input/output port P1 differs from the charged storage apparatus voltage, or when the discharged storage apparatus voltage differs from the voltage of the input/output port P4, or when the voltage of the input/output port P1 and the voltage of the input/output port P4 are equal.

The reason for this is that in the multiport power supply apparatus 100C, the voltage of the input/output port P1 and the charged storage apparatus voltage are equal when the switch between the input/output port P1 and the input/output port to which the charged storage apparatus is connected is normal.

Further, in the multiport power supply apparatus 100C, the discharged storage apparatus voltage and the voltage of the input/output port P4 are equal when the switch between the input/output port to which the discharged storage apparatus is connected and the input/output port P4 is normal.

Furthermore, in the multiport power supply apparatus 100C, when all of the switches are normal, the charging circuit and the power supply circuit are electrically separated, and therefore, as long as the generated voltage of the power generation apparatus 23 is set to be larger than the voltages of all of the storage apparatuses, the voltage of the input/output port P1 and the voltage of the input/output port P4 do not become equal.

Next, having determined that an abnormality occurs in at least one switch, the switch abnormality detection unit 13 switches all of the switches to the conductive condition. The reason for this is that when an abnormality occurs even in only one switch, the multiport power supply apparatus 100C cannot be operated as expected through the control executed by the condition switching unit 11. As a result, the operation of the multiport power supply apparatus 100C is continued in a second best operating condition. Further, the switch abnormality detection unit 13 outputs a control signal to the power generation apparatus 23 to control the power generation apparatus 23 such that the generated voltage of the power generation apparatus 23 remains within a predetermined range. For example, the predetermined range is a range extending from the second predetermined value β (12 V, for example) to the first predetermined value α (13 V, for example). As a result, an excessively large voltage is not applied to the electric load 20.

Here, referring to FIG. 12, processing (to be referred to hereafter as "switch abnormality detection processing") performed by the switch abnormality detection unit 13 to detect an abnormality in a switch will be described. FIG. 12 is a flowchart showing a flow of the switch abnormality detection processing. The control device 1C executes the switch abnormality detection process repeatedly at predetermined period intervals. Note that the control device 1C may execute the switch abnormality detection processing at a predetermined timing such as during startup of the vehicle, for example.

First, when power generation by the power generation apparatus 23 is underway, the switch abnormality detection unit 13 of the control device 1C stops the power generation by the power generation apparatus 23 (step S31). This is to prevent the generated voltage of the power generation apparatus 23 from affecting the voltages of the storage apparatuses when the voltages of the storage apparatuses are obtained. Note that in this case, the discharged storage apparatus is connected to the electric load 20 via the input/output port P1, and the charged storage apparatus is connected to the power generation apparatus 23 via the input/output port P4.

Next, the switch abnormality detection unit 13 obtains the respective voltages of the plurality of storage apparatuses constituting the multiport power supply apparatus 100C, and derives the highest of the obtained voltages as a reference voltage RV (step S32).

Next, the switch abnormality detection unit 13 sets a value obtained by adding a predetermined value $\Delta RV$ to the reference voltage RV as the generated voltage of the power generation apparatus 23 (step S33). In so doing, a condition in which the voltage of the input/output port P4 is larger than the voltages of all of the storage apparatuses when no abnormality occurs in the switch is established.

Next, the switch abnormality detection unit 13 starts power generation by the power generation apparatus 23 (step S34). In so doing, a condition in which a switch abnormality can be detected is established.

Next, the switch abnormality detection unit 13 determines whether or not a predetermined condition is satisfied (step S35). In this embodiment, the predetermined condition is satisfied when the voltage of the input/output port P1 is equal to the charged storage apparatus voltage, the discharged storage apparatus voltage is equal to the voltage of the input/output port P4, and the voltage of the input/output port P1 differs from the voltage of the input/output port P4.

More specifically, when the charged storage apparatus is the first storage apparatus 21, the switch abnormality detection unit 13 determines whether or not a condition according to which the voltage of the input/output port P1 is equal to the voltage of the input/output port P3, the voltage of the input/output port P2 is equal to the voltage of the input/output port P4, and the voltage of the input/output port P1 differs from the voltage of the input/output port P4 is satisfied.

Alternatively, when the charged storage apparatus is the second storage apparatus 22, the switch abnormality detection unit 13 determines whether or not a condition according to which the voltage of the input/output port P1 is equal to the voltage of the input/output port P2, the voltage of the input/output port P3 is equal to the voltage of the input/output port P4, and the voltage of the input/output port P1 differs from the voltage of the input/output port P4 is satisfied.

After determining that the predetermined condition is not satisfied (NO in step S35), the switch abnormality detection unit 13 outputs a control signal to the output apparatus 9 to display a message indicating that an abnormality has been detected in the switch on the in-vehicle display (step S36).

More specifically, when the charged storage apparatus is the first storage apparatus 21 and the switch abnormality detection unit 13 determines that the voltage of the input/output port P1 differs from the voltage of the input/output port P3, a message indicating that an abnormality occurs in the third switch 7 is displayed on the in-vehicle display. Further, when the switch abnormality detection unit 13 determines that the voltage of the input/output port P2 differs from the voltage of the input/output port P4, a message indicating that an abnormality occurs in the second switch 6 is displayed on the in-vehicle display. Furthermore, when the switch abnormality detection unit 13 determines that the voltage of the input/output port P1 is equal to the voltage of the input/output port P4, a message indicating that an abnormality occurs in at least one of the first switch 5 and the fourth switch 8 is displayed on the in-vehicle display.

Alternatively, when the charged storage apparatus is the second storage apparatus 22 and the switch abnormality detection unit 13 determines that the voltage of the input/output port P1 differs from the voltage of the input/output port P2, a message indicating that an abnormality occurs in the first switch 5 is displayed on the in-vehicle display. Further, when the switch abnormality detection unit 13 determines that the voltage of the input/output port P3 differs from the voltage of the input/output port P4, a message indicating that an abnormality occurs in the fourth switch 8 is displayed on the in-vehicle display. Furthermore, when the switch abnormality detection unit 13 determines that the voltage of the input/output port P1 is equal to the voltage of the input/output port P4, a message indicating that an abnormality occurs in at least one of the second switch 6 and the third switch 7 is displayed on the in-vehicle display.

After determining that the predetermined condition is satisfied (YES in step S35), on the other hand, the switch abnormality detection unit 13 executes step S37 without outputting a control signal to the output apparatus 9.

Next, the switch abnormality detection unit 13 determines whether or not an attempt has been made to detect a switch abnormality in all operating conditions of the multiport power supply apparatus 100C (step S37). In this embodiment, a determination is made as to whether or not an attempt has been made to detect a switch abnormality in each of a first operating condition and a second operating condition. The first operating condition is an operating condition in which the first storage apparatus 21 serves as the discharged storage apparatus and the second storage apparatus 22 serves as the charged storage apparatus, while the second operating condition is an operating condition in which the second storage apparatus 22 serves as the discharged storage apparatus and the first storage apparatus 21 serves as the charged storage apparatus.

When it is determined that an attempt has not yet been made to detect a switch abnormality in all of the operating conditions (NO in step S37), the switch abnormality detection unit 13 switches the operating condition of the multiport power supply apparatus 100C to the other operating condition (step S38), and then executes the processing of step S31 onward. When it is determined that an attempt has been made to detect a switch abnormality in all of the operating conditions (YES in step S37), the switch abnormality detection unit 13 determines whether or not an abnormality has been detected in any of the switches (step S39).

When it is determined that an abnormality has been detected in one of the switches (YES in step S39), the switch abnormality detection unit 13 switches all of the switches to the conductive condition and controls the generated voltage of the power generation apparatus 23 to the predetermined range (step S40).

More specifically, the switch abnormality detection unit 13 switches all of the first to fourth switches 5 to 8 to the conductive condition. As a result, power can be supplied to the electric load 20 from the power generation apparatus 23 via the third switch 7 and the fourth switch 8 even when the switch abnormality detection unit 13 detects an abnormality in the first switch 5 or the second switch 6. Further, power can be supplied to the electric load 20 from the power generation apparatus 23 via the first switch 5 and the second switch 6 even when the switch abnormality detection unit 13 detects an abnormality in the third switch 7 or the fourth switch 8.

The switch abnormality detection unit 13 also controls the generated voltage of the power generation apparatus 23 to the predetermined range. As a result, an excessively large voltage is not applied to the electric load 20.

Furthermore, the switch abnormality detection unit 13 switches all of the switches to the conductive condition regardless of the switch in which the abnormality is detected. The switch abnormality detection unit 13 may therefore switch all of the switches to the conductive condition at the point where an abnormality is detected in one of the switches without attempting to detect a switch abnormality in all of the operating conditions that can be realized by the multiport power supply apparatus 100C.

Note that when at least two of the paths linking the input/output port P1 and the input/output port P4 via the input/output ports to which the storage apparatuses are connected are functioning normally, the switch abnormality detection unit 13 need not switch all of the switches to the conductive condition. For example, after determining that the switch between a specific storage apparatus and the power generation apparatus 23 is stuck in the cutoff (OFF) condition, the switch abnormality detection unit 13 disconnects only the path passing through the input/output port to which the specific storage apparatus is connected. Thereafter, the switch abnormality detection unit 13 may cause the condition switching unit 11 to continue switching the operating condition of the multiport power supply apparatus 100C.

Hence, the switch abnormality detection unit 13 determines the occurrence of an abnormality in a switch on the basis of a magnitude relationship to be established between the respective voltages of the input/output ports P1 to P4 when the switch is normal. As a result, the switch abnormality detection unit 13 can determine the occurrence of an abnormality in the switch accurately.

Further, the switch abnormality detection unit 13 switches all of the switches to the conductive condition after detecting an abnormality in any one switch. With the switch abnormality detection unit 13, therefore, the operation of the multiport power supply apparatus 100C can be continued as long as all of the paths linking the input/output port P1 and the input/output port P4 are not simultaneously in the cutoff condition. In other words, power can be supplied to the electric load 20 from the power generation apparatus 23.

Embodiments of the invention were described in detail above, but the invention is not limited to the above embodiments, and various amendments and replacements may be applied to the above embodiments without departing from the scope of the invention.

For example, in the above embodiments, the multiport power supply apparatus 100A may include at least one of the storage apparatus abnormality detection unit 12 and the switch abnormality detection unit 13. Further, the multiport power supply apparatus 100B may include the switch abnormality detection unit 13 instead of the storage apparatus abnormality detection unit 12.

The invention claimed is:

1. A vehicular power supply apparatus comprising:
   a first port configured to be connected to an electric load that is configured to be operated using power supplied independently by each of a first storage device and a second storage device;
   a second port configured to be connected to the first storage apparatus;
   a third port configured to be connected to the second storage apparatus;
   a fourth port configured to be connected to a power generation apparatus;
   a first switch disposed on a power line between the first port and the second port;
   a second switch disposed on a power line between the second port and the fourth port;
   a third switch disposed on a power line between the first port and the third port;
   a fourth switch disposed on a power line between the third port and the fourth port; and
   a processor configured to: switch, based on at least one of a state of the first storage device and a state of the second storage device, between
     a first condition in which the first switch is conductive, the second switch is cut off, the third switch is cut off, and the fourth switch is conductive, and
     a second condition in which the first switch is cut off, the second switch is conductive, the third switch is conductive, and the fourth switch is cut off.

2. The vehicular power supply apparatus according to claim 1, wherein the processor is further configured to: in the first condition, control the first switch, the second switch, the third switch, and the fourth switch such that power is supplied to the electric load from the first storage apparatus, the first storage apparatus is disconnected from the power generation apparatus, and the second storage apparatus is charged by the power generation apparatus.

3. The vehicular power supply apparatus according to claim 1, the processor is further configured to: in the second condition, control the first switch, the second switch, the third switch, and the fourth switch such that power is supplied to the electric load from the second storage apparatus, the second storage apparatus is disconnected from the power generation apparatus, and the first storage apparatus is charged by the power generation apparatus.

4. The vehicular power supply apparatus according to claim 1, wherein:
   each of the first switch and the third switch are constituted by a switching element configured such that a conductive condition of the respective switching element is controlled; and
   the processor is further configured to:
     in the first condition, control the switching element of the first switch so that conduction is established gradually between the electric load and the first storage apparatus; and
     in the second condition, control the switching element of the third switch so that conduction is established gradually between the electric load and the second storage apparatus.

5. The vehicular power supply apparatus according to claim 4, wherein the processor is further configured to control a current that flows through the switching element in the conductive condition.

6. The vehicular power supply apparatus according to claim 1, wherein:
   each of the first switch and the third switch are constituted by either a depression type field-effect transistor or an enhancement type field-effect transistor; and
   the processor is further configured to:
     when each of the first switch and the third switch are constituted by the depression type field-effect transistor:
       in the first condition, control a drain current of the depression type field effect transistor of the first switch to gradually increase by gradually bringing a gate voltage of the depression type field effect transistor of the first switch close to zero; and
       in the second condition, control a drain current of the depression type field effect transistor of the third switch to gradually increase by gradually bringing a gate voltage of the depression type field effect transistor of the first switch close to zero; and
     when each of the first switch and the third switch is constituted by the enhancement type field-effect transistor:
       in the first condition, control a drain current of the enhancement type field-effect of the first switch to gradually increase by gradually bringing a gate voltage of the enhancement type field-effect transistor of the first switch away from zero; and
       in the second condition, control a drain current of the enhancement type field-effect of the third switch to gradually increase by gradually bringing a gate voltage of the enhancement type field-effect transistor of the third switch away from zero.

7. The vehicular power supply apparatus according to claim 1, wherein the processor is further configured to:
   determine a charge-discharge condition of each of the first storage apparatus and the second storage apparatus, and
   switch between the first condition or the second condition when the charge-discharge condition of the first storage apparatus or the charge-discharge condition of the second storage apparatus reaches a predetermined condition.

8. The vehicular power supply apparatus according to claim 7, wherein processor is further configured to determine the predetermined condition on the basis of a voltage of the first storage apparatus and a voltage of the second storage apparatus.

9. The vehicular power supply apparatus according to claim 7, wherein the processor is further configured to:

in the first condition:
 determine whether a voltage of the second storage apparatus exceeds a first predetermined value or a voltage of the first storage apparatus is smaller than a second predetermined value that is smaller than the first predetermined value, and
 switch from the first condition to the second condition when the voltage of the second storage apparatus exceeds the first predetermined value or the voltage of the first storage apparatus is smaller than the second predetermined value; and
in the second condition:
 determine whether the voltage of the first storage apparatus exceeds the first predetermined value or the voltage of the second storage apparatus is smaller than the second predetermined value, and
 switch from the second condition to the first condition when the voltage of the first storage apparatus exceeds the first predetermined value or the voltage of the second storage apparatus is smaller than the second predetermined value.

10. The vehicular power supply apparatus according to claim 1, wherein the processor is further configured to: detect an abnormality in at least one of the first storage apparatus and the second storage apparatus.

11. The vehicular power supply apparatus according to claim 10, wherein the processor is further configured to: determine that an abnormality has been detected in at least one of the first storage apparatus and the second storage apparatus when a voltage of the at least one of the first storage apparatus and the second storage apparatus is smaller than a predetermined abnormality value.

12. The vehicular power supply apparatus according to claim 11, wherein the processor is further configured to: when an abnormality is detected in one of the first storage apparatus and the second storage apparatus, control the switches so that power is supplied to the electric load from the other one of the first storage apparatus and the second storage apparatus that is different than the one of the first storage apparatus and the second storage apparatus in which abnormality is detected.

13. The vehicular power supply apparatus according to claim 1, wherein the processor is further configured to: detect an abnormality in at least one of the first switch, the second switch, the third switch, and the fourth switch.

14. The vehicular power supply apparatus according to claim 13, wherein
the processor is further configured to:
 set a generated voltage of the power generation apparatus at a higher value than a voltage of the first storage apparatus and a voltage of the second storage apparatus, and
 detect an abnormality in at least one of the first switch, the second switch, the third switch, and the fourth switch on the basis of whether or not a voltage of the first port is equal to a voltage of a charged storage apparatus, a voltage of a discharged storage apparatus is equal to a voltage of the fourth port, and the voltage of the first port differs from the voltage of the fourth port; and
the charged storage apparatus is a storage apparatus, from among the first storage apparatus and the second storage apparatus, which is connected to the power generation apparatus via the fourth port, and the discharged storage apparatus is a storage apparatus, from among the first storage apparatus and the second storage apparatus, which is connected to the electric load via the first port.

15. The vehicular power supply apparatus according to claim 13, wherein the processor is further configured to: control each of the first switch, the second switch, the third switch, and the fourth switch so that each of the switches is conductive after determining that an abnormality has been detected in at least one of the first switch, the second switch, the third switch, and the fourth switch.

16. The vehicular power supply apparatus according to claim 1, wherein
the state of the first storage device and the state of the second storage device are charge/discharge states, and
the processor is configured to: switch, based on the at least one of the charge/discharge state of the first storage device and/or the charge/discharge state of the second storage device, between the first condition and the second condition.

17. The vehicular power supply apparatus according to claim 1, wherein the processor is further configured to: to switch, based on the at least one of the state of the first storage device and the state of the second storage device, after receiving outputs from at least one voltage sensor.

18. The vehicular power supply apparatus according to claim 1, wherein the processor is further configured to: perform the first condition control operation or the second condition control operation, after receiving outputs from at least one voltage sensor.

19. A vehicular power supply apparatus comprising:
a processor configured to:
 determine whether to perform a first condition control operation or a second condition control operation based on at least one of a state of a first storage device and a state of a second storage device; and
 perform the first condition control operation or the second condition control operation based on the at least one of the state of the first storage device and the state of the second storage device, wherein
 the first condition control operation controls a first switch and a fourth switch to be conductive, and a second switch and a third switch to be cut off, and
 the second condition control operation controls the first switch and the fourth switch to be cut off, and the second switch and the third switch to be conductive,
 the first switch is disposed on a power line between a first port and a second port,
 the second switch is disposed on a power line between the second port and a fourth port,
 the third switch is disposed on a power line between the first port and a third port,
 the fourth switch disposed on a power line between the third port and the fourth port,
 the first port is configured to be connected to an electric load for powering the vehicle that is configured to be operated using power supplied independently by each of the first storage device and the second storage device,
 the second port is configured to be connected to the first storage apparatus,
 the third port is configured to be connected to the second storage apparatus, and
 the fourth port is configured to be connected to a power generation apparatus for powering a vehicle.

20. The vehicular power supply apparatus according to claim 19, wherein
  the state of the first power storage device and the state of the second power storage device are charge/discharge states, and
  the processor is configured to: perform the first condition control operation or the second condition control operation based on the at least one of the charge/discharge state of the first storage device and/or the charge/discharge state of the second storage device, between the first condition and the second condition.

* * * * *